United States Patent [19]
Ishizaki et al.

[11] Patent Number: 5,841,977
[45] Date of Patent: Nov. 24, 1998

[54] COMPUTER-BASED CONFERENCING SYSTEM WITH LOCAL OPERATION FUNCTION

[75] Inventors: Takeshi Ishizaki; Yoshiyuki Nakayama, both of Kawasaki; Toshimitsu Hayashi, Hadano; Yoshinobu Tanigawa, Osaka; Minoru Koizumi; Masami Kameda, both of Yokohama, all of Japan

[73] Assignee: Hitachi, Ltd., Tokyo, Japan

[21] Appl. No.: 701,595

[22] Filed: Aug. 22, 1996

[30] Foreign Application Priority Data

Aug. 24, 1995 [JP] Japan ................................. 7-216109

[51] Int. Cl.⁶ ........................... H04L 12/26; H04Q 11/04
[52] U.S. Cl. .............................. 395/200.34; 395/200.54; 345/501; 370/261
[58] Field of Search ................... 395/200.34, 200.54; 345/501; 370/261

[56] References Cited

U.S. PATENT DOCUMENTS

| | | | |
|---|---|---|---|
| 4,525,779 | 6/1985 | Davids et al. | 345/330 |
| 5,195,086 | 3/1993 | Baumgartner et al. | 370/264 |
| 5,490,247 | 2/1996 | Tung et al. | 345/501 |
| 5,493,568 | 2/1996 | Sampat et al. | 370/261 |
| 5,506,832 | 4/1996 | Arshi et al. | 370/241 |
| 5,506,954 | 4/1996 | Arshi et al. | 345/501 |
| 5,515,296 | 5/1996 | Agarwal | 395/200.34 |
| 5,524,110 | 6/1996 | Danneels et al. | 395/200.34 |

OTHER PUBLICATIONS

"Seeing Is Almost Believing", Bill Machrone, PC Magazine, vol. 13, No. 11, pp. 233–251, Jun. 14, 1994.

Primary Examiner—Krisna Lim
Attorney, Agent, or Firm—Fay Sharpe Beall Fagan Minnich & McKee

[57] ABSTRACT

A joint work support system includes a plurality of terminals mutually connected to one another through a network. Each terminal includes a first data communication means and an operation means. The operation means performs operations to support joint work in both a joint work state, when the terminal is connected to another terminal through the network, and a local state, when the terminal is not connected to another terminal through the network. To operate in the local state, each of the terminals includes recording data creating means, second data communication means and reproduction means.

34 Claims, 32 Drawing Sheets

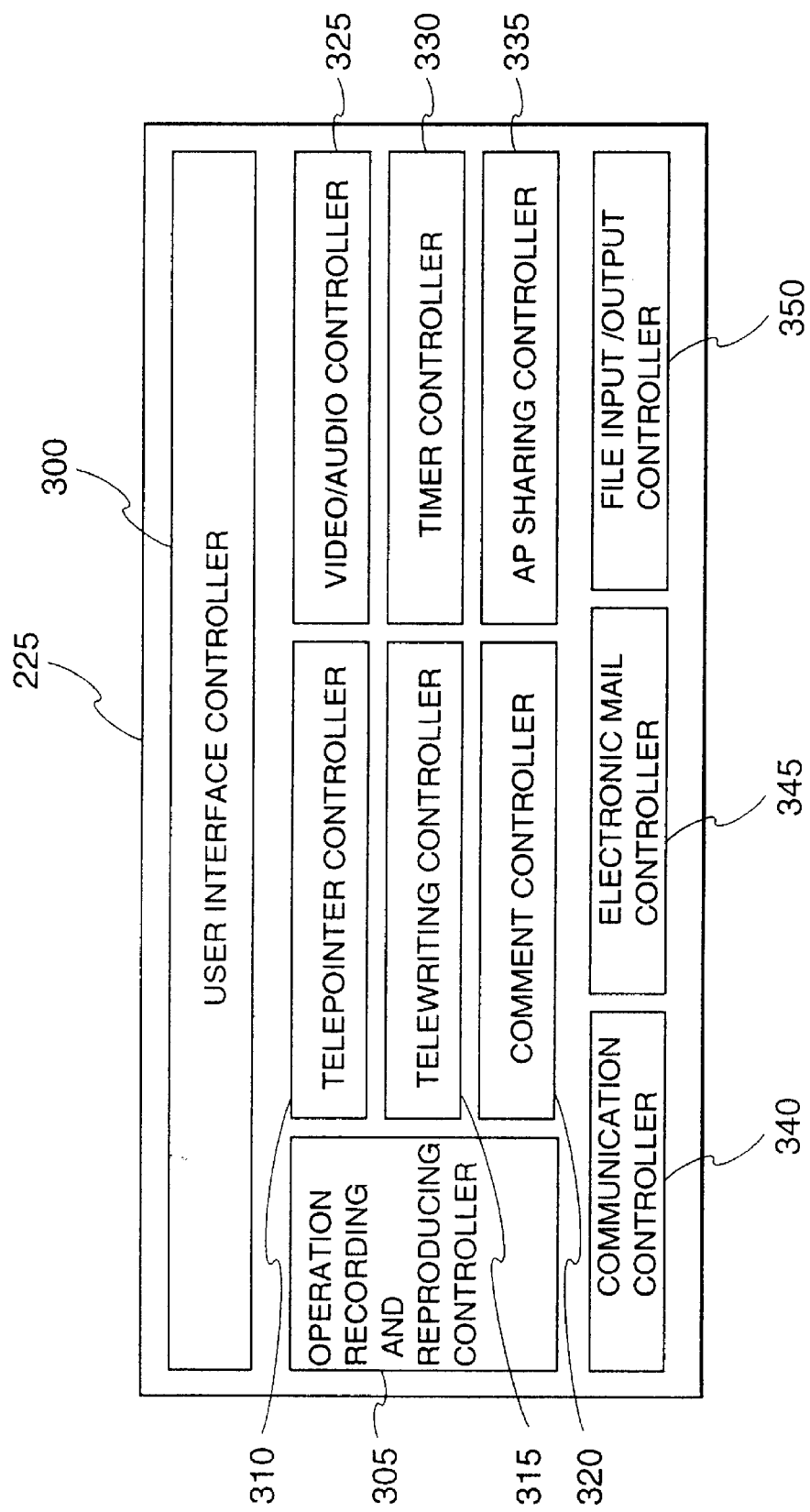

FIG.32

RECTANGULAR OBJECT

| | |
|---|---|
| CREATOR ID | 3300 |
| OBJECT IDENTIFICATION | 3305 |
| LINE ATTRIBUTE | 3310 |
| PAINT-OUT ATTRIBUTE | 3315 |
| COORDINATE 1 (X1,Y1) | 3320 |
| COORDINATE 2 (X2,Y2) | 3325 |
| COMMENT FLAG | 3330 |
| COMMENT INFORMATION | 3335 |
| COMMENT CHARACTER ARRAY | 3340 |
| VOICE COMMENT FLAG | 3345 |
| VOICE COMMENT DATA | 3350 |

FIG.33

OPERATION RECORD

| | |
|---|---|
| RECORDER ID | 3400 |
| OPERATION RECORD TYPE | 3405 |
| LINE ATTRIBUTE | 3410 |
| PAINT-OUT ATTRIBUTE | 3415 |
| COORDINATE 1 (X1,Y1) | 3420 |
| TIME STAMP 1 | 3425 |
| COORDINATE 2 (X2,Y2) | 3430 |
| TIME STAMP 2 | 3435 |
| COORDINATE N (XN,YN) | 3440 |
| TIME STAMP N | 3445 |

COMPUTER-BASED CONFERENCING SYSTEM WITH LOCAL OPERATION FUNCTION

BACKGROUND OF THE INVENTION

1. Field of the Invention

The present invention relates to a joint work support system using computers which are connected to one another through a network.

2. Description of Related Art

A joint work support system, known as a desktop video conference system, has been recently developed and manufactured for public use. In addition to a so-called video telephone function which enables mutual communication of pictures (motion pictures) and sounds picked up by a video camera, the joint work support system is provided with various functions to support joint working, for example, a remote white-board function with which screen images displayed on a computer may be commonly displayed (shared) on other computers connected to the computer and/or information written on the common (shared) screen images, an application sharing function of sharing (making common) the operation of an application itself, etc.

Such a desktop video conference system as described above has been developed and put in the market as "ProShare" produced by Intel Corporation, "Telemedia" produced by AT&T, etc. which are introduced in "Seeing is Almost Believing (PC Magazine, Vol.13, No. 11)".

In addition, an electronic mail system which enables transmission of text data or files to other computers which are connected through a network, has become popular.

In the conventional desktop video conference system as described above, windows may be shared on the screens of computers to perform joint work on a real-time basis. However, in this system, even when a user (communication sender) wishes to connect to another user (communication recipient), the user cannot always or immediately connect to the other, user unlike a telephone. For example, in such a case that although a communication sender wishes to connect to a communication recipient, the communication recipient is absent or he cannot immediately respond to the communication request because he is very busy, the conventional desktop video conference system as described above is unusable. Therefore, the communication sender must try to connect to the communication recipient once again or he must ask the communication recipient to call back to the communication sender for connection.

In such a case, electronic mail or voice mail may be created and transmitted to the communication recipient when the connection to the communication recipient is impossible. However, when a communication content to be transmitted is complicated or it contains a large amount of reference documents, the transmission of only sentences or voice is insufficient.

SUMMARY OF THE INVENTION

An object of the present invention is to provide a joint work support system in which even in such a local state that a side requesting communication (hereinafter referred to as "communication sender") cannot connect to a side to which the communication is requested (hereinafter referred to as "a communication recipient"), the communication sender can create data with a joint work support function which is provided to each terminal of the system as if the communication sender were performing a joint work with the communication recipient, and then transmit the created data to a terminal of the communication recipient.

Another object of the present invention is to provide a joint work support system which receives data transmitted from another terminal and reproduces the received data according to a time corresponding relationship at the time when the data are created, whereby communication is performed between the terminals as if a joint work were performed.

In order to achieve the above objects, a joint work support system comprising plural terminals which are mutually connected to one another through a network, is characterized in that each of the plural terminals includes first data communication means for mutually communicating video data and audio data existing on the terminal with other terminals, and operation means which has a common (shared) area provided on at least a part of the screen thereof so as to be shared with the plural terminals and serves to perform operations to support joint work to be performed in the common area, wherein each of the terminals includes recording data creating means for creating recording data containing at least operation data among the operation data, video data existing on the terminal and audio data existing on the terminal, the operation data comprising data corresponding to an operation performed by the operating means and time information representing the time when the operation is performed, second data communication means for transmitting the created recording data to other terminals and receiving recording data which are created and transmitted by the other terminals, and reproduction means for reproducing the recording data received by the second data communication means in accordance with the time information contained in the recording data.

The data on the operation which are contained in the operation data contain at least one selected from the group of information on the operation itself, information on an operation object and information on an image displayed as an operation result on the common area, together with the time information thereon.

In the joint work support system as described above, the operation means can perform operations to achieve the joint work in both cases where a terminal is connected to another terminal through the network (under a joint work state) and where a terminal is not connected to another terminal through the network (under a local state). In the local state, the operations are performed on a common area which is temporarily set on the terminal concerned in advance.

According to the joint work support system of the present invention which comprises plural terminals each having means for communicating video and audio data like the desktop video conference system or the like, even in the local state where a terminal is not connected to another terminal, the terminal can achieve the same various joint work support functions which are supplied in the joint work state where a terminal is connected to another terminal.

Therefore, even under the local state, a user (communication sender) may present information to another user (communication recipient) with pictures or sounds (voice) as if he were connected to the communication recipient, or supplies or writes data on the temporarily-preset common area on the screen of the terminal, whereby recording data comprising a combination of audio data, video data, and operation data containing data on an operation on the temporarily set common area and time information on a time when the operation is performed, can be created on each terminal and then transmitted to the communication recipient by using the second data communication means such as electronic mail. Here, the video data and the audio data are assumed to originally contain time information.

Subsequently, in each terminal, the recording data which are transmitted from another terminal through the second data communication means thereof are received and then reproduced at a desired time, whereby the communication recipient can watch and listen to a presentation based on the pictures, the sounds and the operations which are contained in the received recording data.

According to the present invention, even when a communication sender fails in connection to a communication recipient because the communication recipient is absent or the like, the communication sender can finish his business at this stage without the cumbersome procedure of retrying the connection once again later or leaving a message asking the communication recipient to call back for the connection.

Furthermore, according to the present invention, a new method may be supplied in which a presentation using a combination of pictures, sounds, operations, etc. is created from the beginning if it necessary and is transmitted to the communication recipient. By beforehand transmitting the presentation based on the combination of the pictures, the sounds, the operations, etc. to the communication recipient and afterwards connecting to the communication recipient, more efficient work can be performed, and the connection cost can be reduced.

BRIEF DESCRIPTION OF THE DRAWINGS

FIG. 3 is a block diagram showing a software construction of an electronic interactive control program stored in the embodiment shown in FIG. 1;

FIG. 32 is an illustration showing a construction of drawing object data of the document window data of FIG. 31;

FIG. 33 is an illustration showing a construction of an operation recording record of the document window data of FIG. 31;

DETAILED DESCRIPTION OF THE PREFERRED EMBODIMENTS

A joint work support system according to a preferred embodiment of the present invention will be described with reference to, the accompanying drawings.

Figure 1:
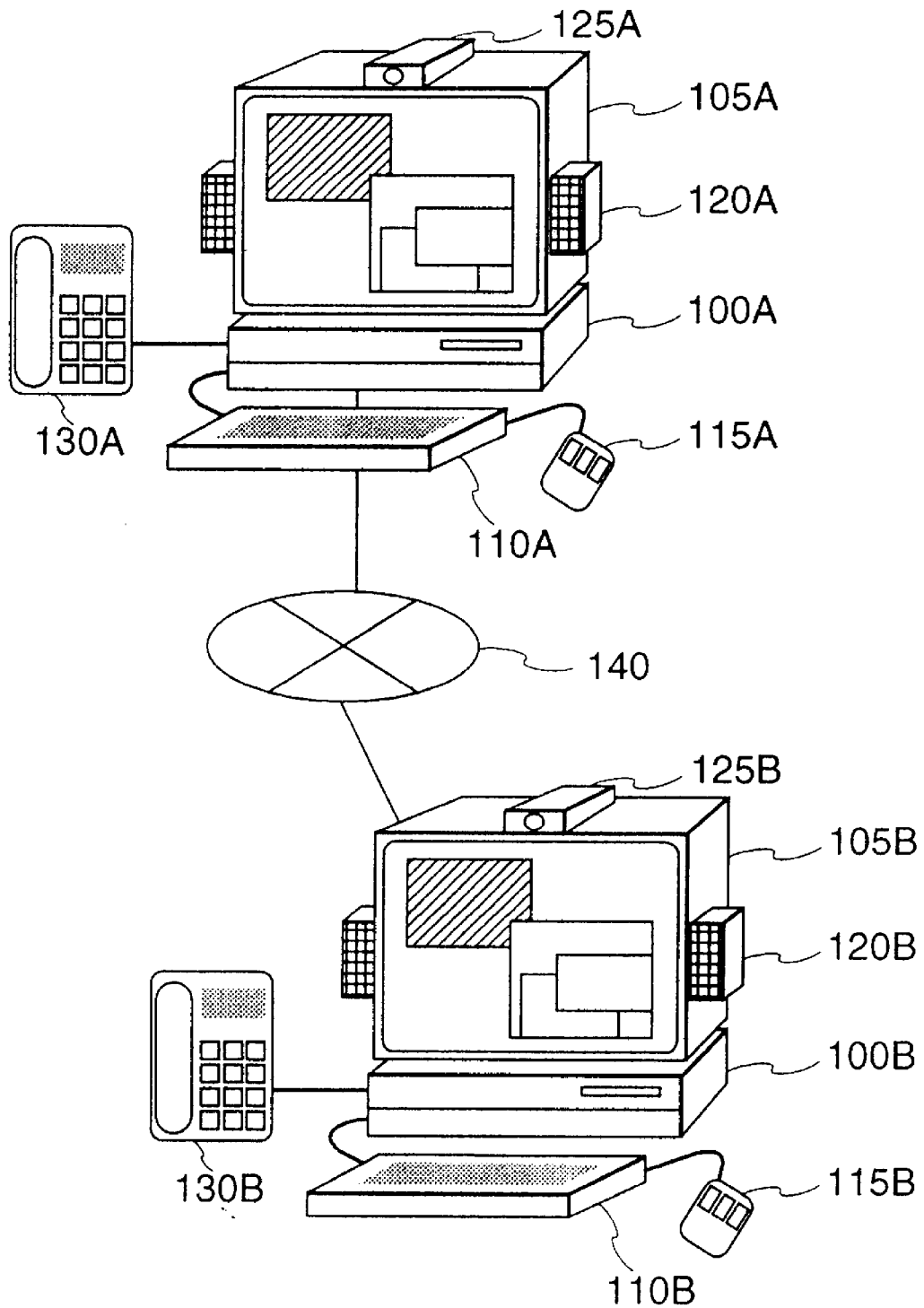
FIG. 1 is an illustration showing an overall construction of an embodiment of a joint work support system according to the present invention.

FIG. 1 shows the outline of the joint work support system of an embodiment. A terminal 100A is connected to a display 105A, a keyboard 110A, a mouse 115A, a speaker 120A, a video camera 125A and a telephone 130A. A personal computer or an exclusive terminal having a conference function may be used as the terminal. The terminal 100A is also connected to another terminal 100B. The terminal 100B is also connected to the same types of peripheral equipments as the terminal 100A.

A LAN (Local Area Network) may be used when the network 140 is in a branch. If plural terminals are connected to one another in a broader area, they may be connected to one another through a public telephone network by using a modem or through ISDN (Integrated Services Digital Network).

In this embodiment, the telephone 130A may be used not only as a normal telephone, but also as an input/output equipment for voice. If necessary, a microphone and a speaker may be built into a terminal to use the terminal as a voice input/output equipment.

As shown in FIG. 1, the system is designed so that two terminals are connected to each other through the network, however, the joint work support system of the present invention may be designed so that three or more terminals are connected to one another for mutual communication.

Furthermore, in the system of this embodiment, electronic mail is frequently used. In order to apply the system of this embodiment to an electronic mail system, the joint work support system of this embodiment may be designed so that a server machine for electronic mail is added to the configuration shown in FIG. 1.

Figure 2:
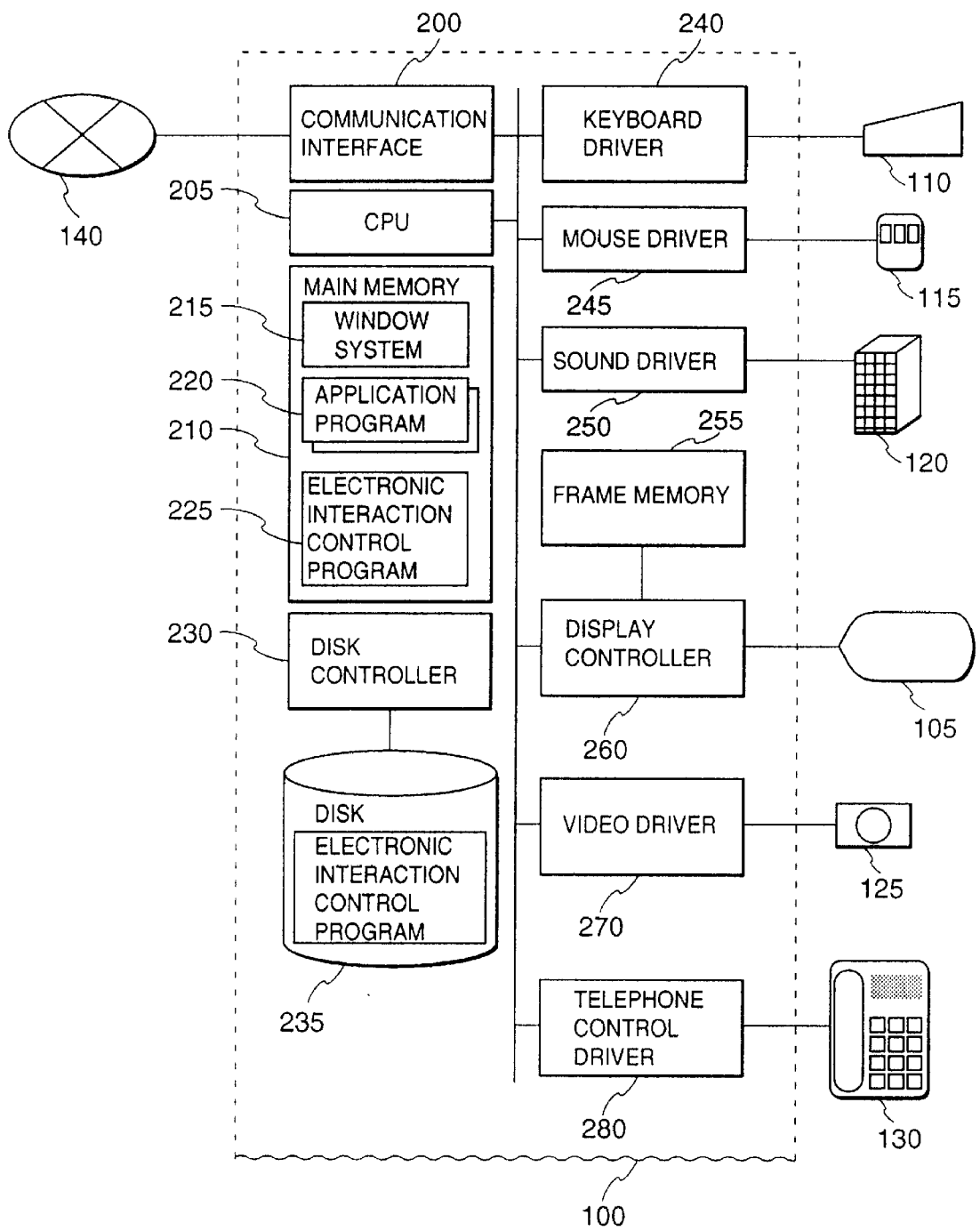
FIG. 2 is a block diagram showing a system construction of a terminal of the embodiment shown in FIG. 1.

FIGS. 2 shows the system construction of each terminal 100 (the terminal 100A and the terminal 100B) of the system of this embodiment.

In the terminal 100 of this embodiment, an input from the keyboard 110 is processed by a keyboard driver 240, and an input of the mouse 115 is processed by a mouse driver 245. In order to output some voice, the speaker 120 which is connected to a sound driver 250 is activated. An input from the video camera 125 is processed by a video driver 270.

An input/output operation based on the telephone 130 is controlled by a telephone driver 280. The telephone driver 280 enables the telephone 130 to operate as a kind of voice input/output device at the terminal as well as a conventional telephone. In this embodiment, a typical telephone having a hand set is used as the telephone 130, however, a head set or a device such as a speaker phone having a combination of a microphone and a speaker may be used to enable a user to keep both his hands free.

The terminal 100 is connected to the network 140 through a communication interface 200.

A CPU 205 reads out and executes various programs stored in a main memory 210. In this embodiment, the main memory 210 stores a window system 215, various application programs 220 and an electronic interaction control program 225 for supplying joint work support functions. If necessary, the CPU 205 uses a disc controller 230 to store data in a memory disc 235 or conversely read out the data from the memory disc 235.

The processing results of the programs as described above are written in a frame memory 255. The content of the frame memory 255 which is connected to the display 105 through a display controller 260 is displayed on the display 105.

FIG. 3 shows the construction of the electronic interaction control program 225 for supplying the joint work support functions, which is the feature of the joint work support system of this embodiment.

A user interface controller 300 supplies functions of receiving an instruction from a user of this system, supplying necessary information onto the screen, etc. by using the window system 215.

A telepointer controller 310 supplies functions of displaying an indication object called a "telepointer" in a common area on the screen which is shared among all connected terminals, shifting the telepointer to a desired position, etc.

A telewriting controller 315 supplies functions of writing information in the common area, editing the information, etc.

A comment controller 320 supplies functions of attaching a comment at any position on the common area, correcting the comment, etc. Character arrays input from the keyboard, voice or images may be used as the comment.

A video/audio controller 325 supplies a function of controlling the video camera, the microphone or the speaker to provide pictures/sounds or record pictures or sounds in response to an instruction from the user.

When recorded information is reproduced, a timer controller 330 refers to time information to perform the reproduction at a proper timing.

An application program (hereinafter referred to as "AP") sharing controller 335 supplies a function of enabling screen images displayed by the AP to be shared, and the operation of the AP to be moved together among the shared screens.

All the functions provided by the respective controllers can be recorded and reproduced by an operation recording/reproducing controller 305. The operation recording/reproducing controller 305 records pictures/sounds displayed or reproduced at the terminal or the operation performed by the user together with time information on each data. The recorded information can be stored as a file on a disc or transmitted to another terminal as electronic mail.

A communication controller 340 performs communication with an electronic interaction control program activated in another terminal to receive and transmit information required for a joint work. The communication controller 340 is subjected to proper protocol processing in accordance with the communication network 140 in use.

An electronic mail controller 345 supplies various communication functions using electronic mail, for example, a function of receiving and transmitting electronic mails, a function of searching an address list of an electronic mail system, etc. By using these functions, users of this system can use abundant communication functions of electronic mail with a simple operation without various steps which are ordinarily required for the operation of the electronic mail, even during joint work which is performed by the electronic interaction control program 225.

A file input/output function 350 enables the electronic interaction control program 225 to perform an output/input operation on a file. For example, it is used to store a recording file created by the operation recording/reproducing controller 305.

In this embodiment, as shown in FIG. 3, the electronic interaction control program 225 is designed to have such a program structure that various functions can be added/altered as modules. Therefore, even when new joint work support functions other than as described above are required, the new functions can be easily installed into the system of this embodiment.

Next, a use method of the system of this embodiment and the functions supplied by the system will be described using screen images displayed at the terminal. In this embodiment, it is assumed that two parties participate in joint work to simplify the description of the invention. The same operation as described below is applicable to such a situation where three or more parties participate in joint work.

Figure 4A:
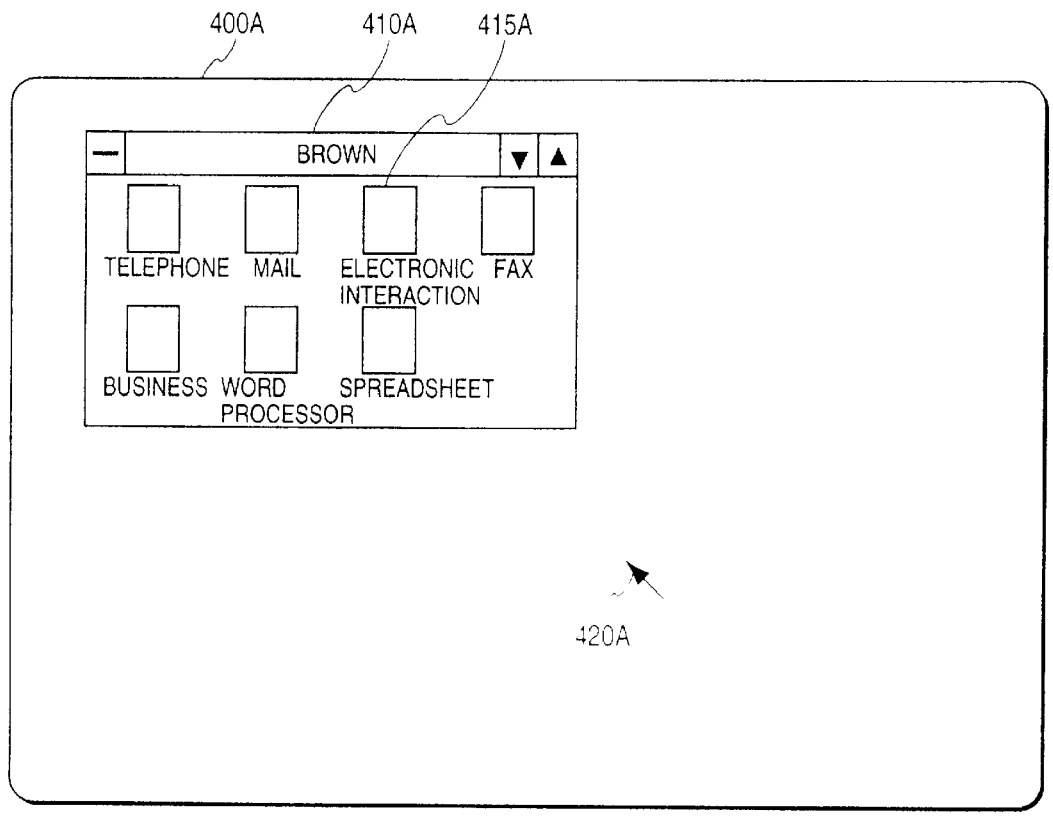
FIGS. 4A and 4B are illustrations showing views on a desktop window which are displayed on a screen of a terminal of the embodiment shown in FIG. 1.
Figure 4B:
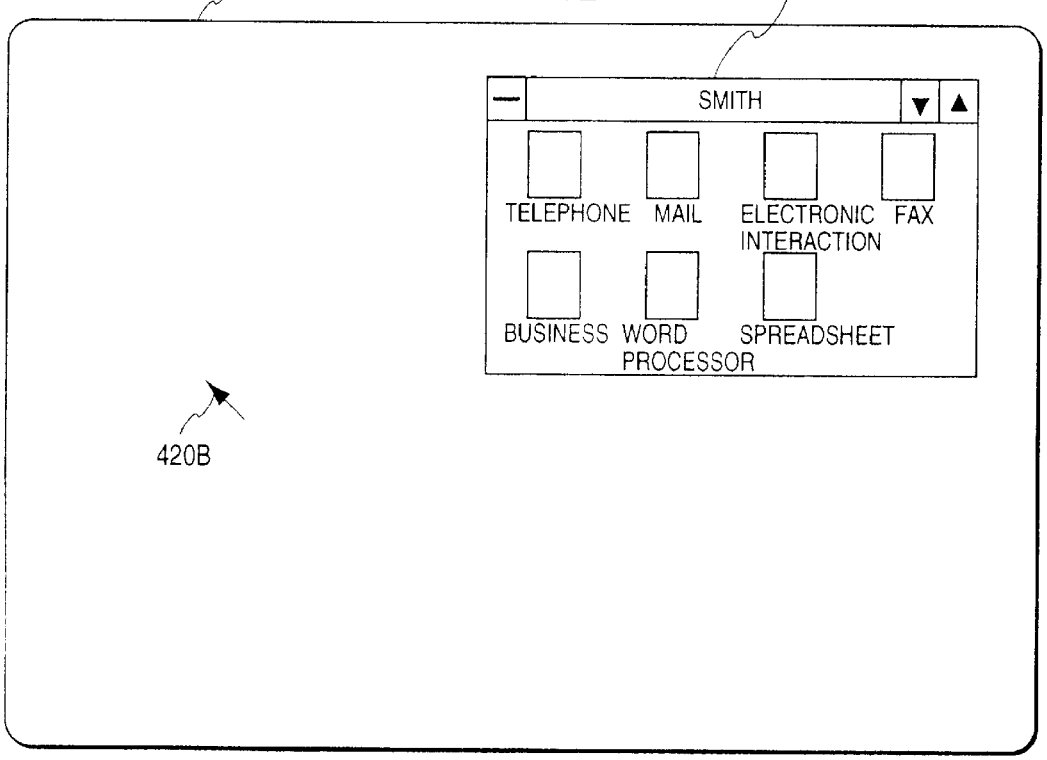

FIGS. 4A and 4B show terminal screens before joint work is started. FIG. 4A shows a terminal screen 400A of a participant A (Mr. Brown), and FIG. 4B shows a terminal screen 400B of a participant B (Mr. Smith). Desktop windows 410A and 410B for starting standard programs are displayed on the respective screen images, and cursors 420A and 420B which are operated by the mouse are also displayed on the screen images.

The electronic interaction can be started by double clicking an electronic interaction icon 415 on the desktop window 410A with the mouse 115A in the above state.

Figure 5A:
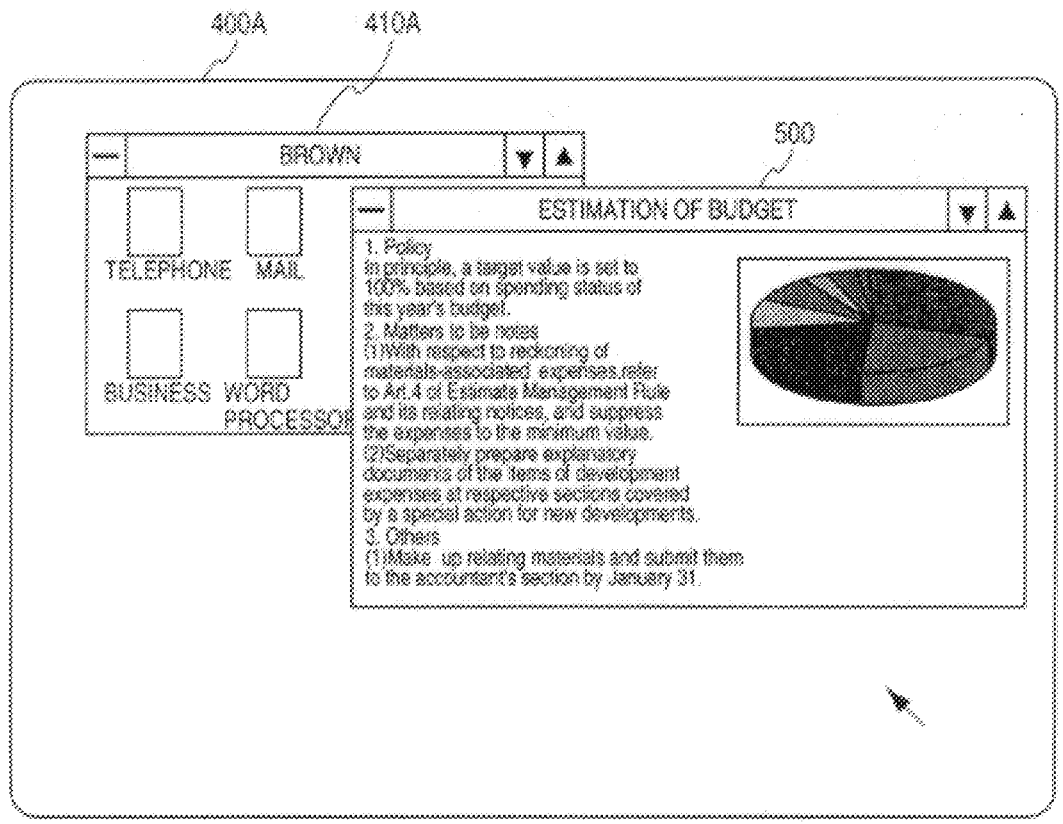
FIGS. 5A and 5B are illustrations showing views of an AP window which are displayed on the terminal screen of the embodiment shown in FIG. 1.
Figure 5B:
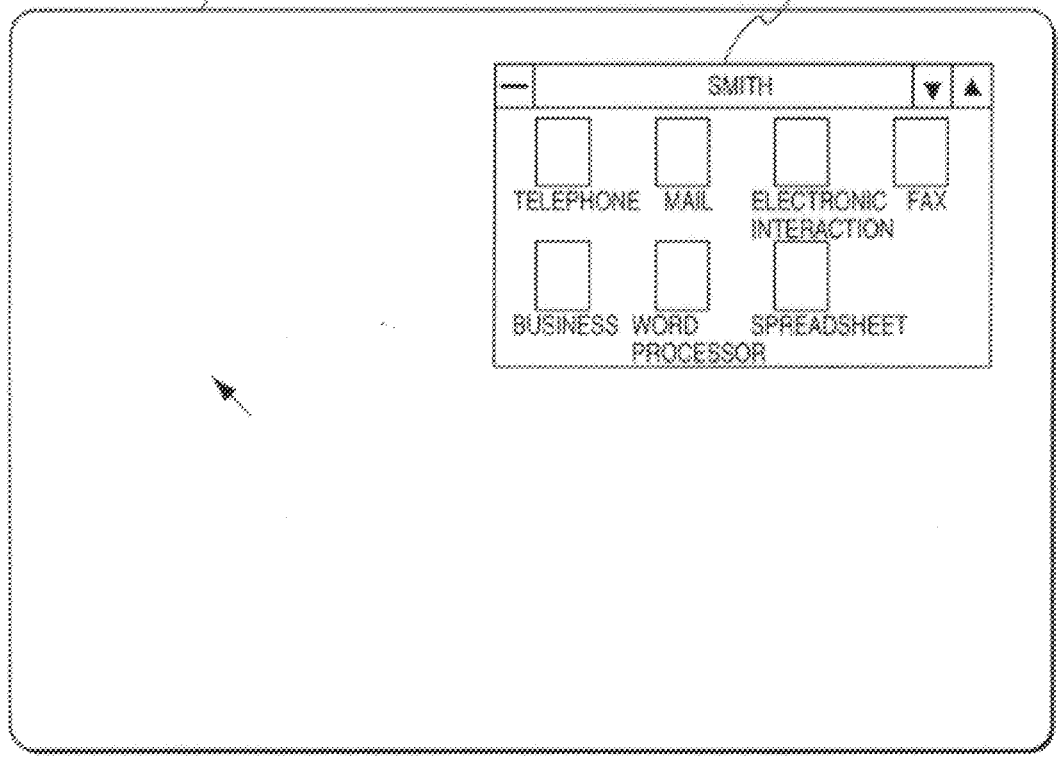

FIGS. 5A and 5B show the terminal screens when the participant starts an AP to be used in the electronic interaction. In this embodiment, an AP window 500 which is named "estimation of budget" is displayed. Any AP may be started as the AP insofar as it is usable at a terminal.

Figure 6A:
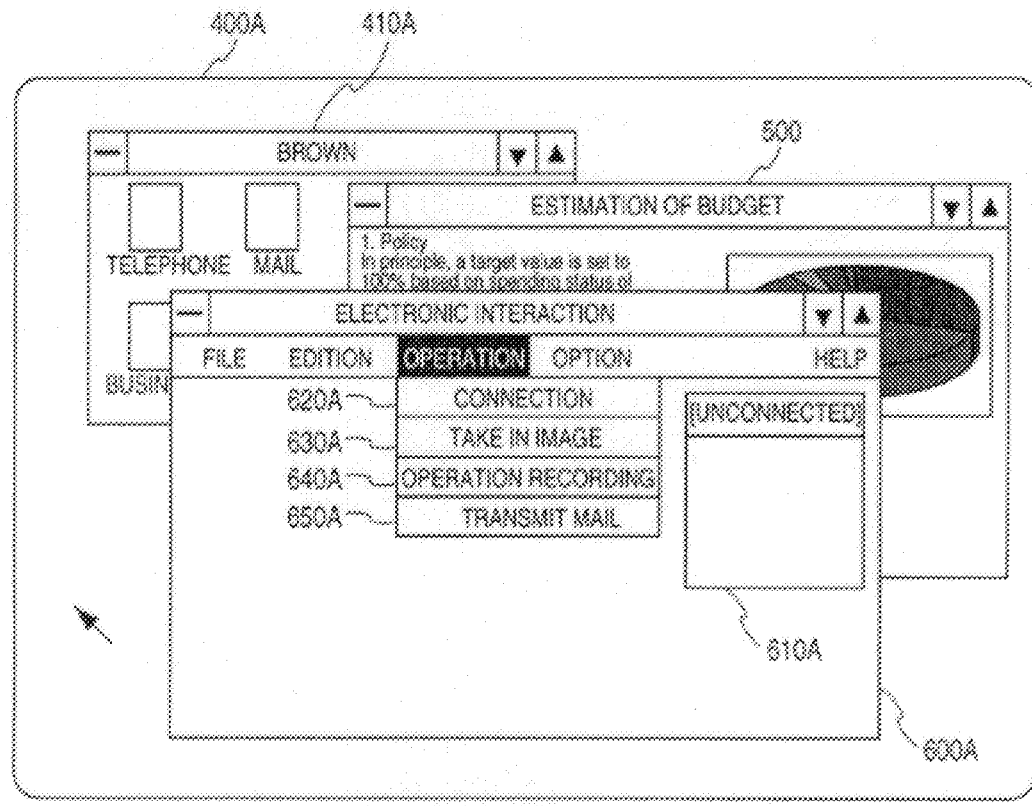
FIGS. 6A and 6B are illustrations showing joint work windows which are displayed on the terminal screen of the embodiment shown in FIG. 1.
Figure 6B:
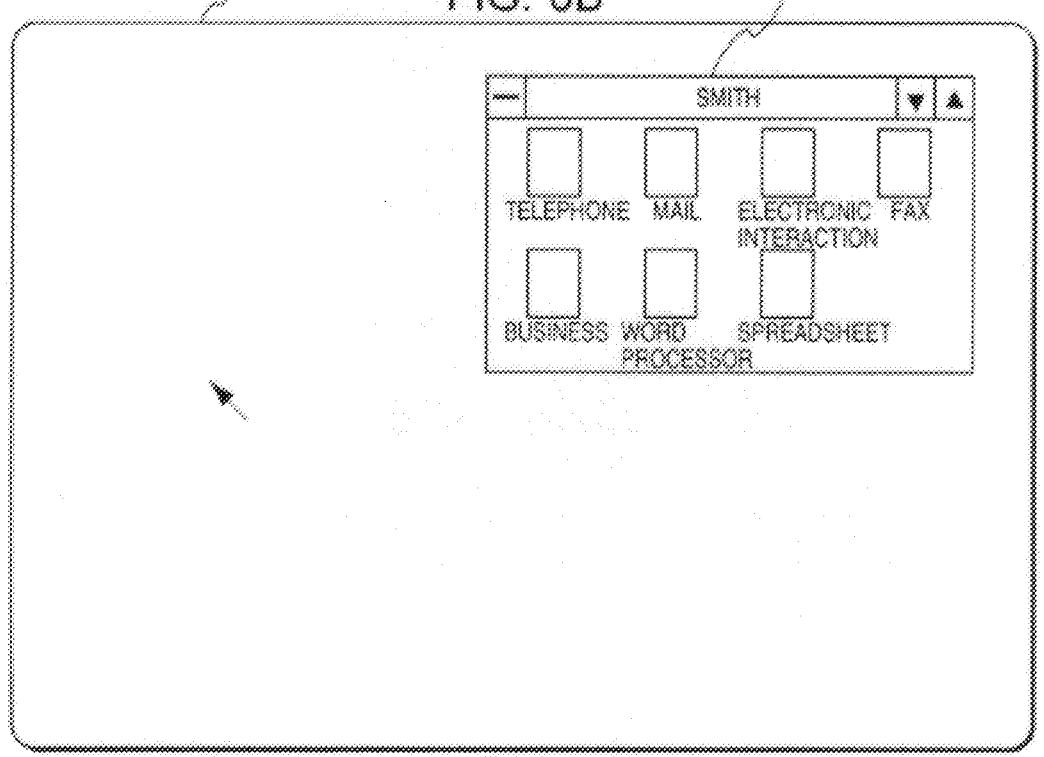

FIGS. 6A and 6B show the terminal screens when the electronic interaction control program 225 is started. In this embodiment, the participant A starts the electronic interaction control program 225, and the joint work window 600A is displayed on the terminal screen 400A. The joint work window 600A is used to perform various operations for the joint work in the system of this embodiment.

A video window 610A is displayed on the joint work window 600A, however, no image is displayed on the video window 610A at this time because the terminal is not connected to another terminal at this time. Some menus are provided on the joint work window 600A. FIG. 6 shows the terminal screens when an operation menu is selected to enable use of a connection command 620A, an image take-in command 630A, an operation recording command 640A, a mail transmission command 650A, etc. A user can operate various operations required for the joint work by selecting these menus.

Figure 7A:
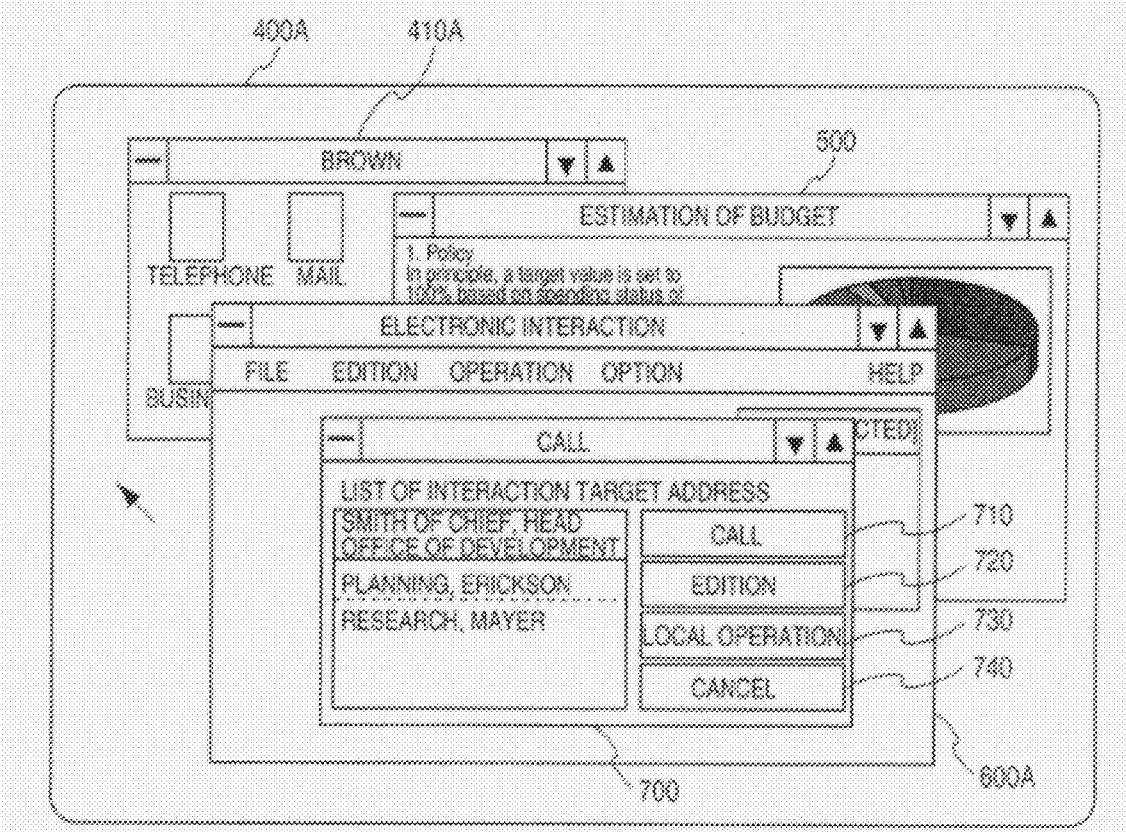
FIGS. 7A and 7B are illustrations showing views of connection target indicating windows which are displayed on the terminal screen of the embodiment shown in FIG. 1.
Figure 7B:
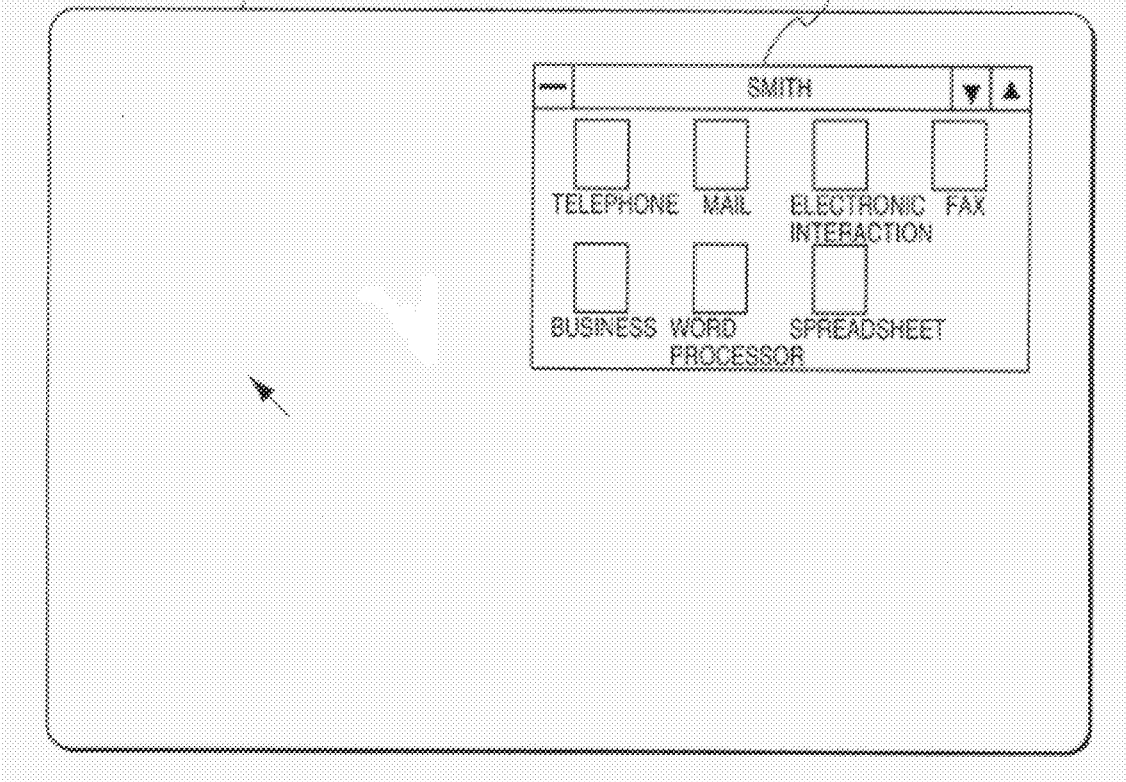

FIGS. 7A and 7B show the terminal screens when the connection command 620A is selected on the joint work window 600A. A connection target indicating window 700 is displayed on the screen to indicate a communication recipient with which the user (the communication sender) wishes to perform the joint work.

Figure 8A:
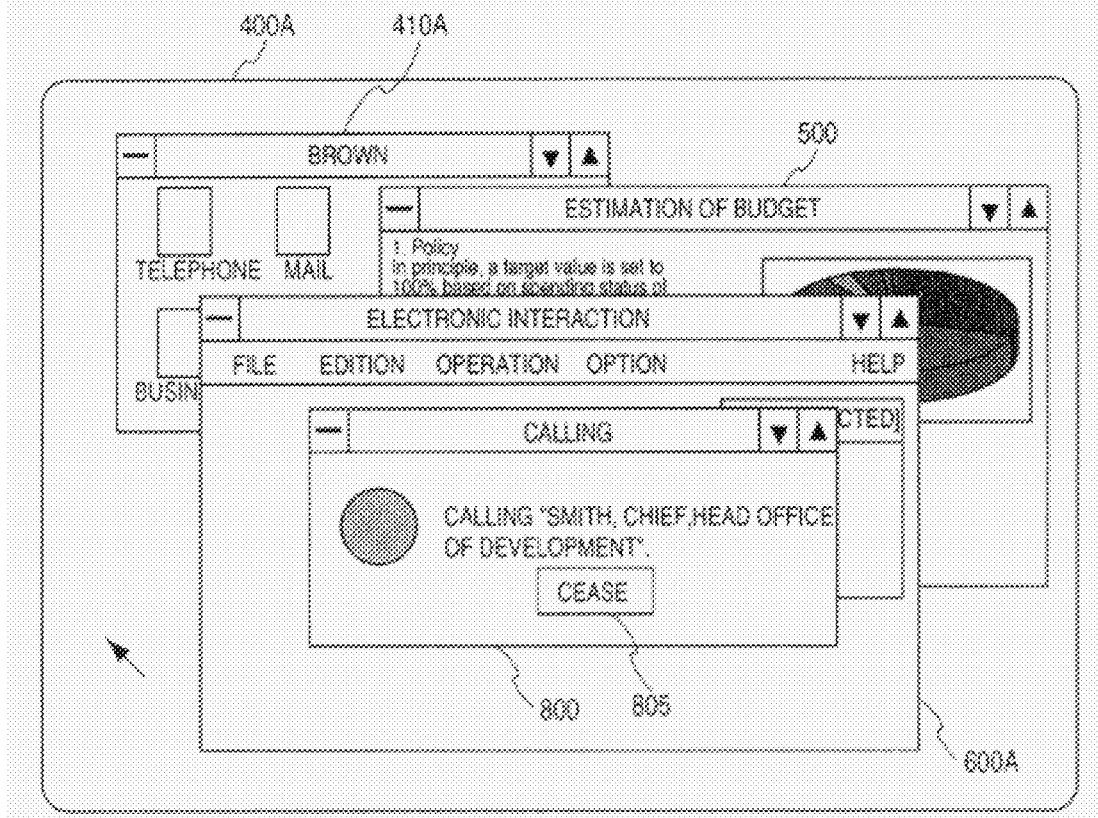
FIGS. 8A and 8B are illustrations showing views under a communication recipient call which are displayed on the terminal display of the embodiment shown in FIG. 1.
Figure 8B:
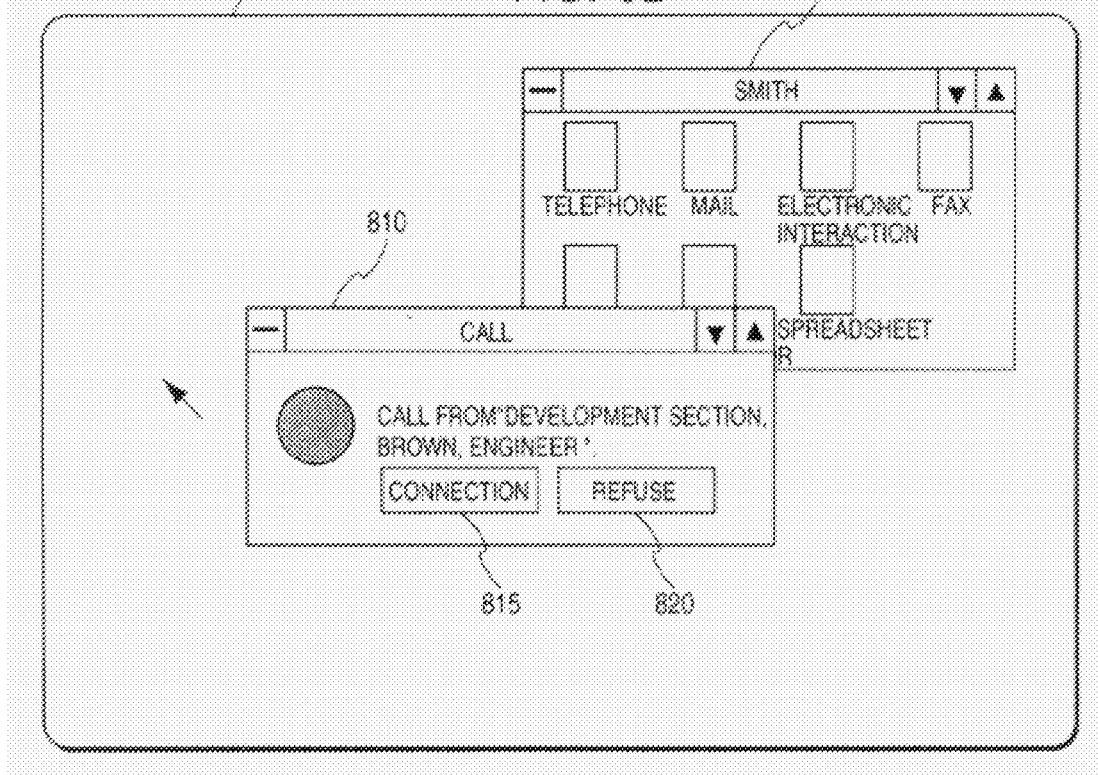

FIGS. 8A and 8B show the terminal screens when a call button 710 is pushed in FIGS. 7A and 7B, respectively. On the terminal screen 400A of the participant A is displayed an in-call display window 800 for indicating the name (participant B) of a communication recipient to which communication sender tries to connect. At this time, upon pushing of a cancel button 805, this calling operation can be canceled. The terminal screen 400B of the participant B displays a call request window 810 for indicating that there is a call from the participant A. At this time, when the participant B pushes the connection button 815, the electronic interaction control program is connected to allow the joint work to start. On the other hand, when the participant B pushes a refusal button 820, the calling operation is canceled.

Figure 9A:
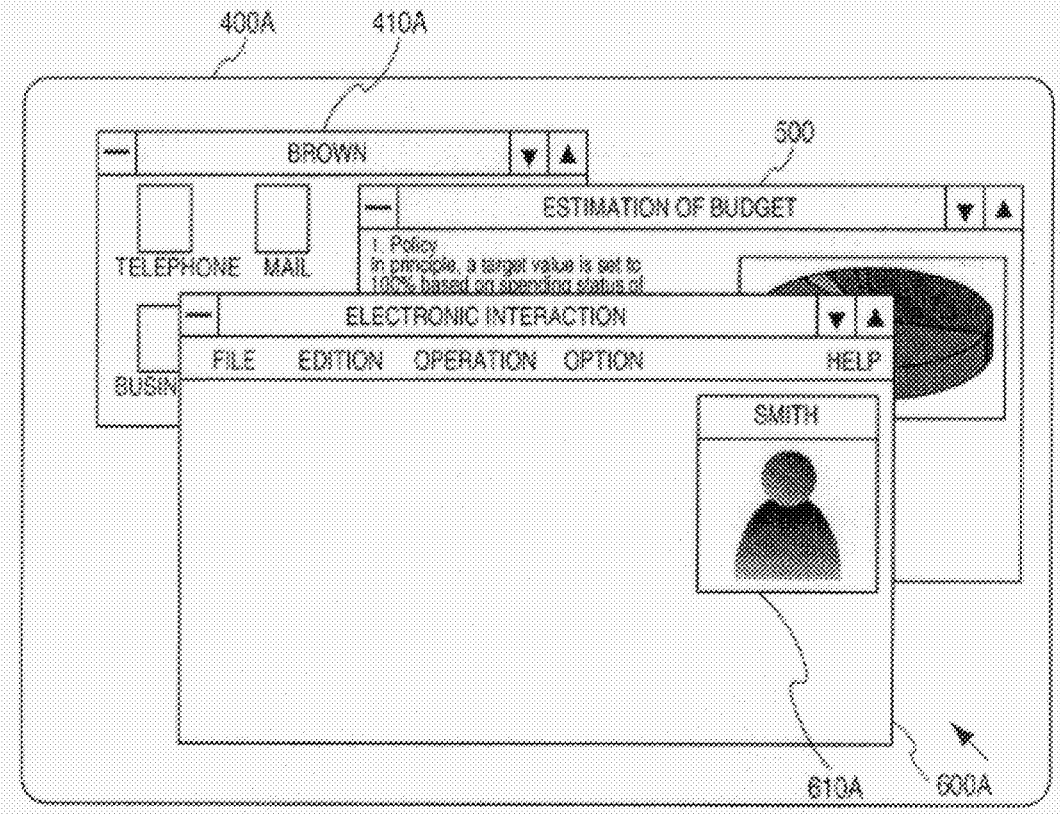
FIGS. 9A and 9B are illustrations showing views at a joint work start time which are displayed on the terminal screen of the embodiment shown in FIG. 1.
Figure 9B:
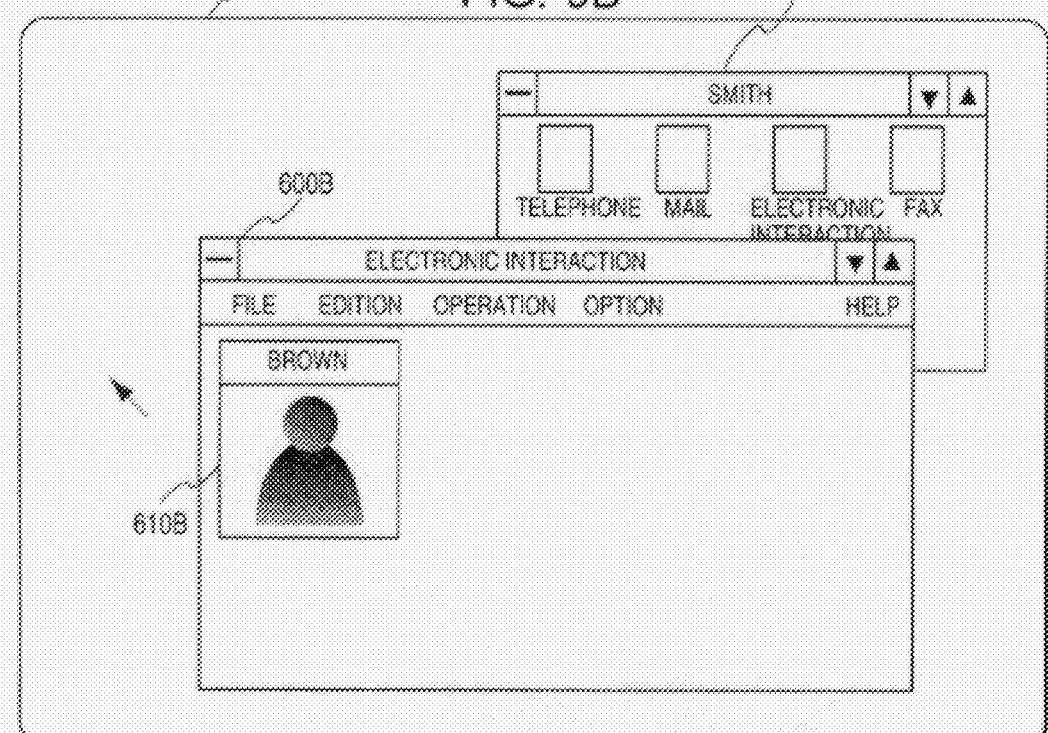

FIGS. 9A and 9B show the terminal screens when the participant A and the participant B are connected to each other. A picture of the participant B is displayed on the video window 610A of the participant A while a picture of the participant A is displayed on the video window 610B of the participant B. At the same time when the connection has been completed, the communication sender can hear the voice of the communication recipient through the speaker 120 or telephone 130. In the above description, the one-to-one connection is adopted. However, when three or more terminals are connected to one another, video windows 610 whose number is equal to the number of terminals are displayed on the terminal screen.

Figure 10A:
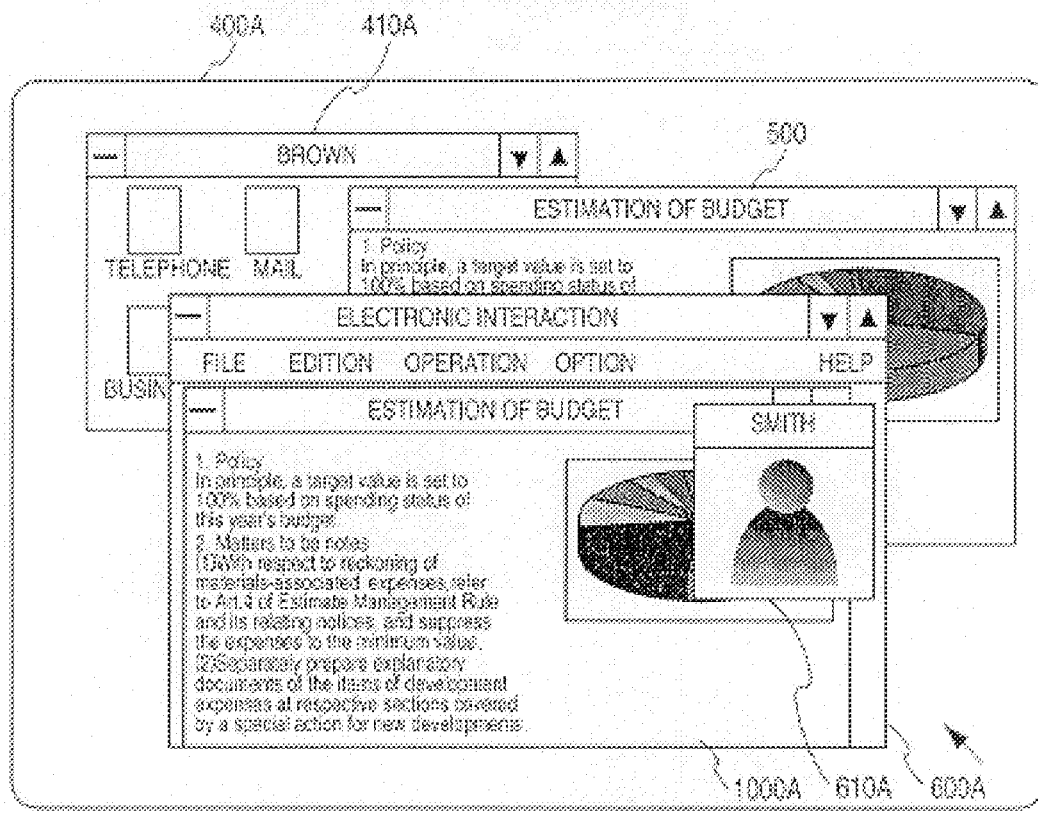
FIGS. 10A and 10B are illustrations showing views having common windows which are displayed on the terminal screen of the embodiment shown in FIG. 1.
Figure 10B:
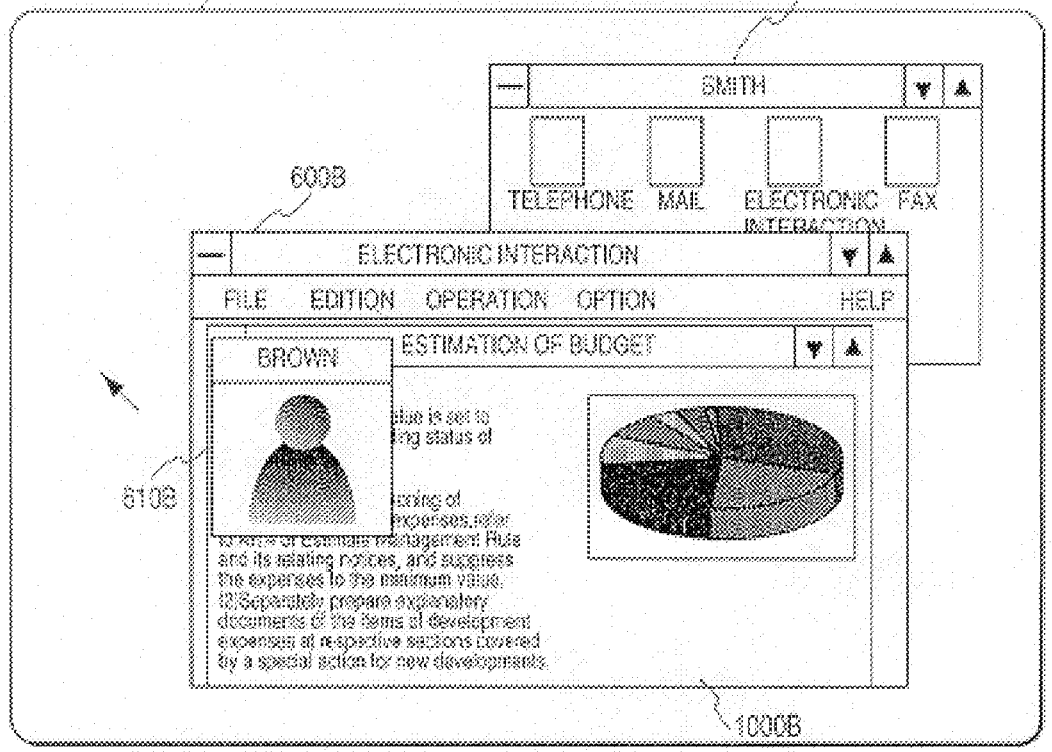

FIGS. 10A and 10B show the terminal screens when the image capture command 630A is selected on the joint work window 600A to take the display content of the AP window 500 into the joint work window 600A. A common window 1000A in which the display content thus taken is directly displayed in the joint work window 600A. At the same time, a common window 1000B is displayed on the joint work window 600B of the participant B. Since data transmitted from the participant A are displayed on the common window 1000B, the participants A and B can watch the same image.

In the following description, each participant is provided with only one common window. However, the system may be designed so that plural common windows as described above are displayed on the joint work window 600.

Figure 11A:
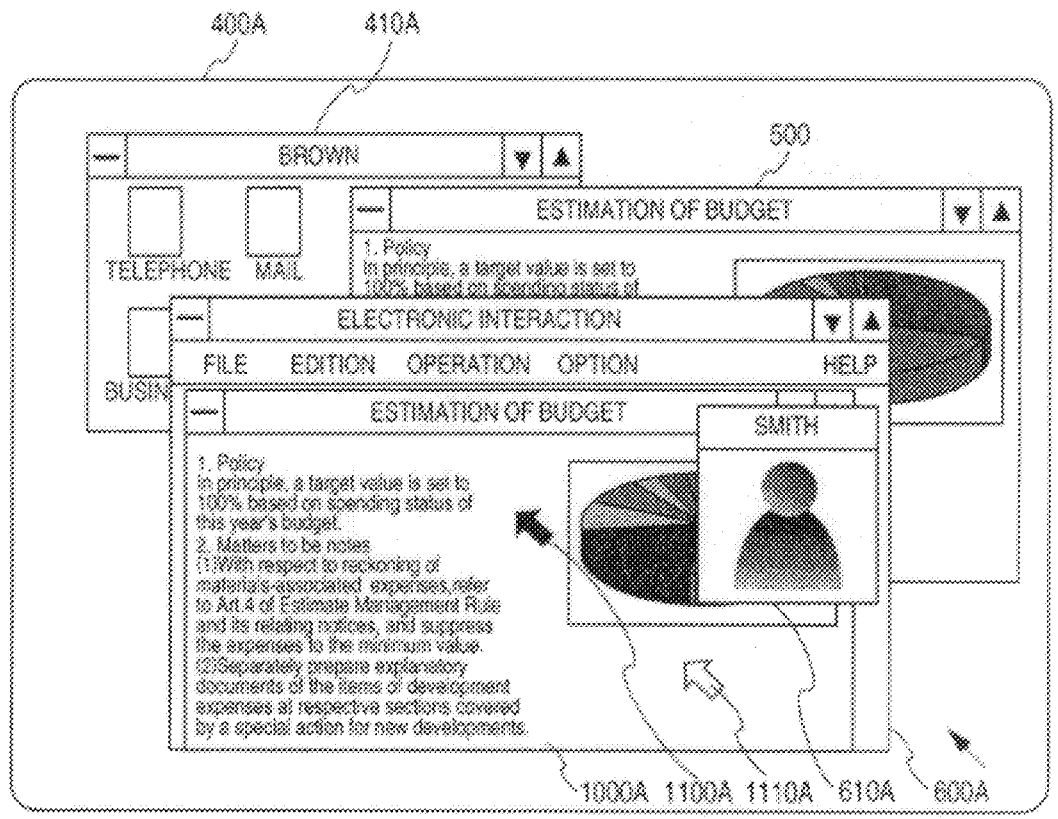
FIGS. 11A and 11B are illustrations showing views under a telepointer operation which are displayed on the terminal screen of the embodiment shown in FIG. 1.
Figure 11B:
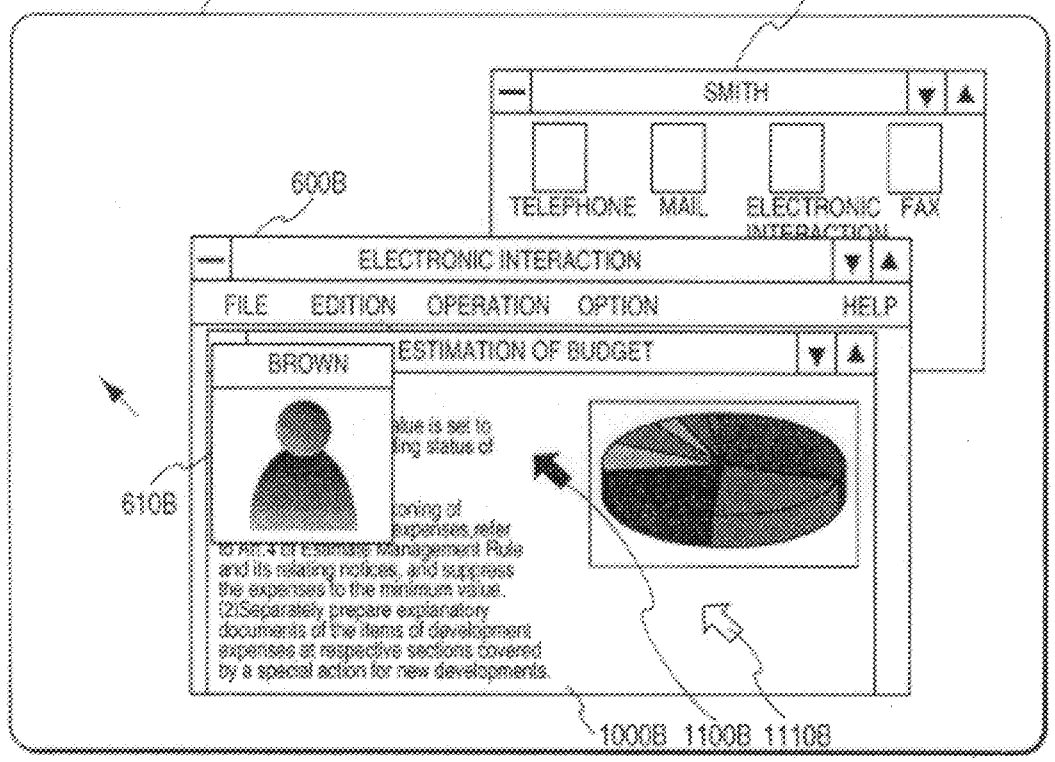

FIGS. 11A and 11B show the terminal screens when the joint work is performed with the telepointer function on the joint work window 600. In the display screen images, a telepointer 1100A operated by the participant A and a telepointer 1110A operated by the participant B are displayed on the common window 1000A of the participant A. Likewise, a telepointer 1100B operated by the participant A and a telepointer 1110B operated by the participant B are displayed on the common window 1000B of the participant B. The telepointers 1100A and 1100B (1110A and 1110B) are moved together with each other. That is, if one participant operates the mouse to shift the telepointer on his screen, the other participant can see the same motion of the telepointer on the other screen image.

Figure 12A:
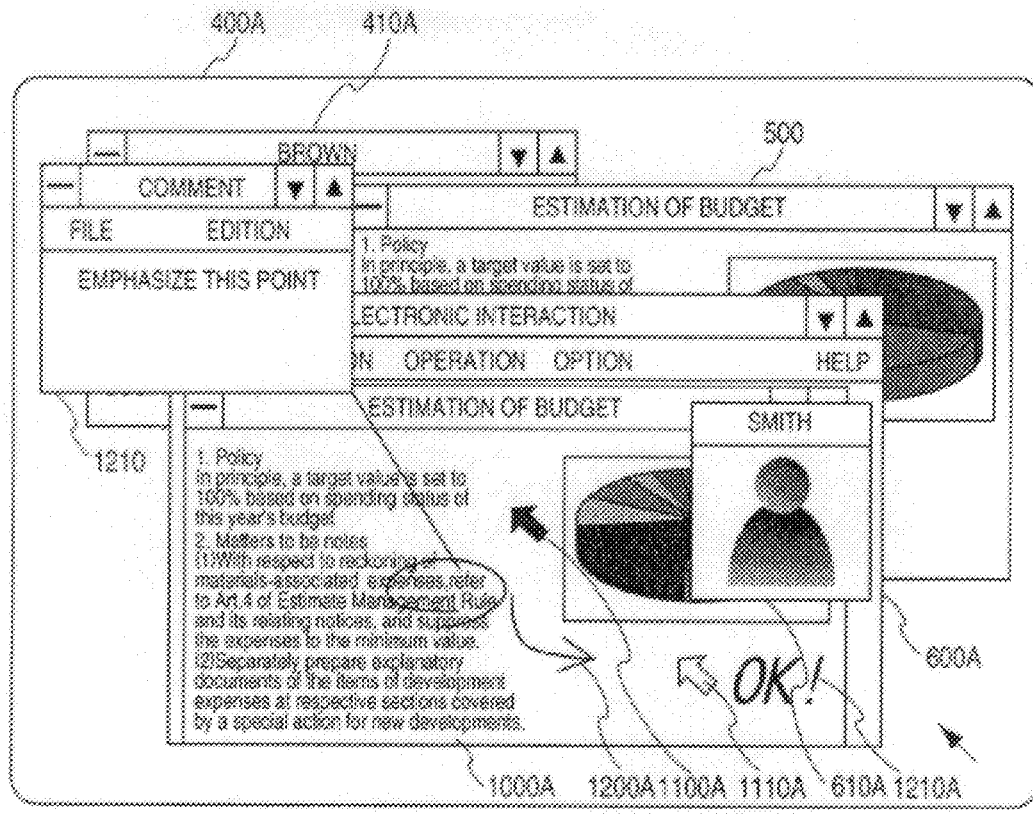
FIGS. 12A and 12B are illustrations showing views under a telewriting operation which are displayed on the terminal screen of the embodiment shown in FIG. 1.
Figure 12B:
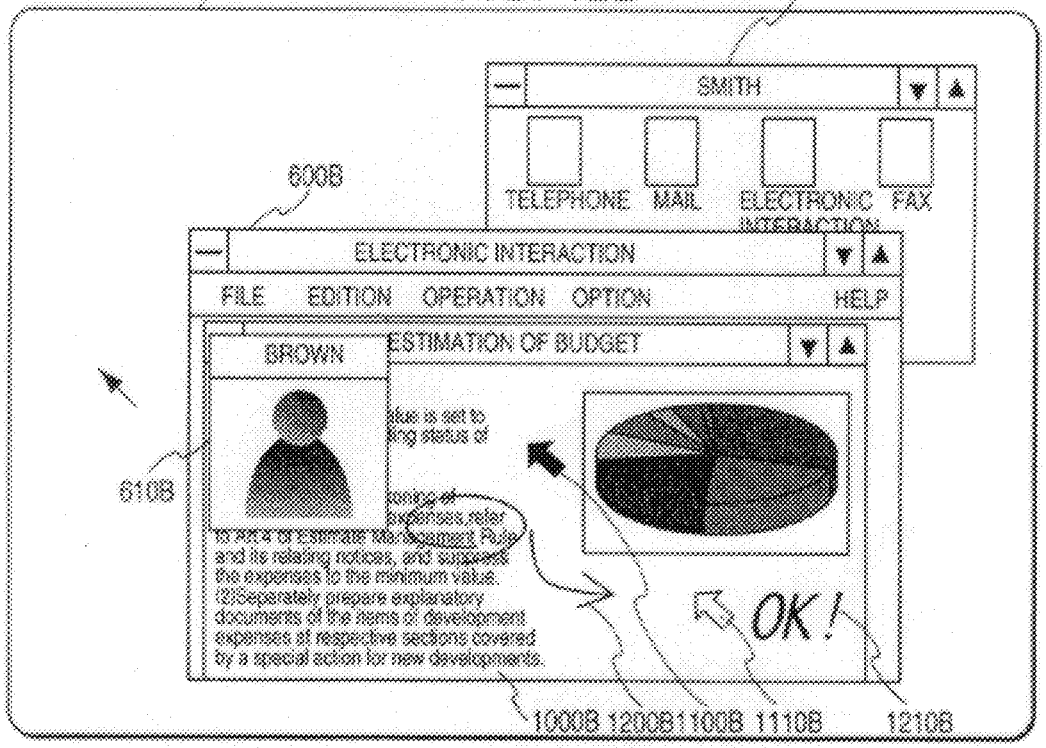

FIGS. 12A and 12B show the terminal screens when the joint work is performed on the joint work window 600 by using the telewriting function. A FIG. 1200A drawn by the participant A and a FIG. 1210A drawn by the participant B are displayed on the common window 1000A of the participant A. Likewise, a FIG. 1200B drawn by the participant A and a FIG. 1210B drawn by the participant B are displayed on the common window 1000B of the participant B. The operation of drawing a figure is performed together with on both screens 400A and 400B. That is, if one participant draws a figure on his screen by operating the mouse, the same figure is drawn on the screen of the other participant.

Further, in FIGS. 12A and 12B, comments 1210A and 1210B, respectively, are attached to the common window 1000A. The comment may be attached to any position on the common window, and character arrays, sound or the like may be also input as the comment.

Figure 13A:
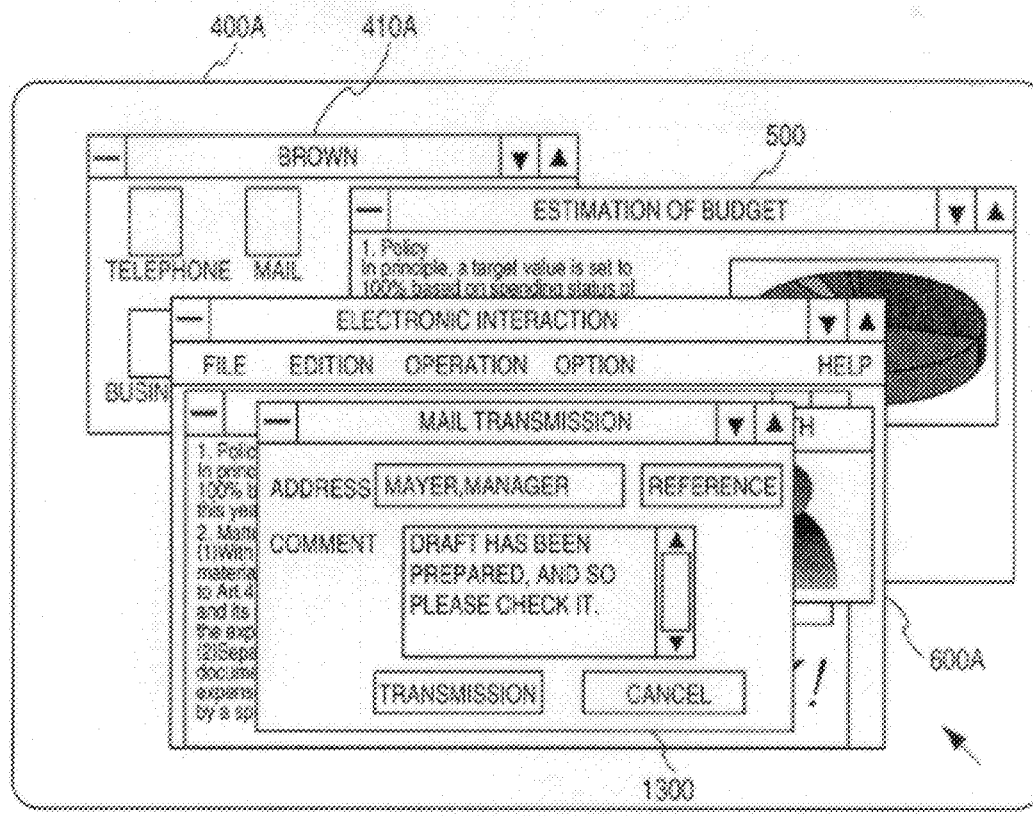
FIGS. 13A and 13B are illustrations showing views at an electronic mail transmission time which are displayed on the terminal screen of the embodiment shown in FIG. 1.
Figure 13B:
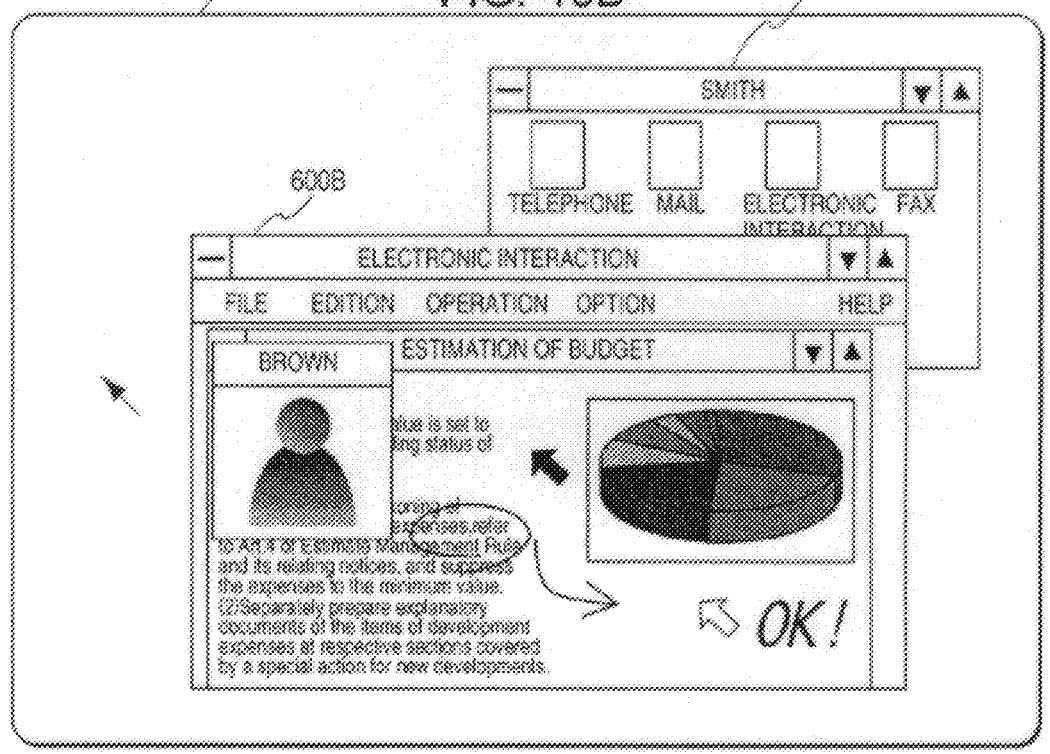

FIGS. 13A and 13B show the terminal screens when the mail transmission command 650A is selected on the joint work window 600A to transmit electronic mail. The electronic mail transmission window 1300 is displayed on the screen 400A, and an address of the electronic mail and a comment attached to the mail may be input.

As described above, the system of this embodiment is designed so that electronic mail can be sent to any address in the course of the electronic interaction. At this time, no extra process of newly starting a program for the electronic mail or the like is needed. In addition, the display content of the current joint work window, a recording result of pictures, voice, operations as described later or the like may be selected as the content of the electronic mail.

According to the system as described above, a real-time communication and a communication using the result of the communication as a message can be made to smoothly cooperate with each other to perform efficient joint work in a broader range.

Figure 14A:
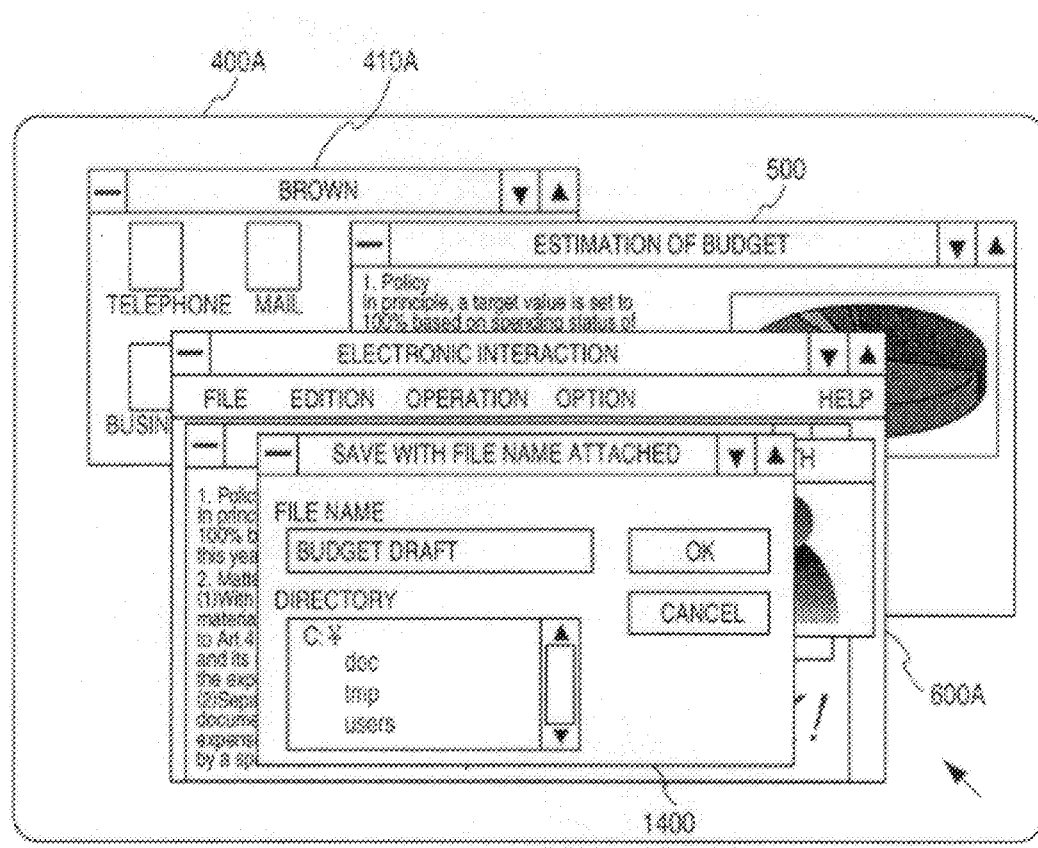
FIGS. 14A and 14B are illustrations showing views at a recording file storage time which are displayed on the terminal screen of the embodiment shown in FIG. 1.
Figure 14B:
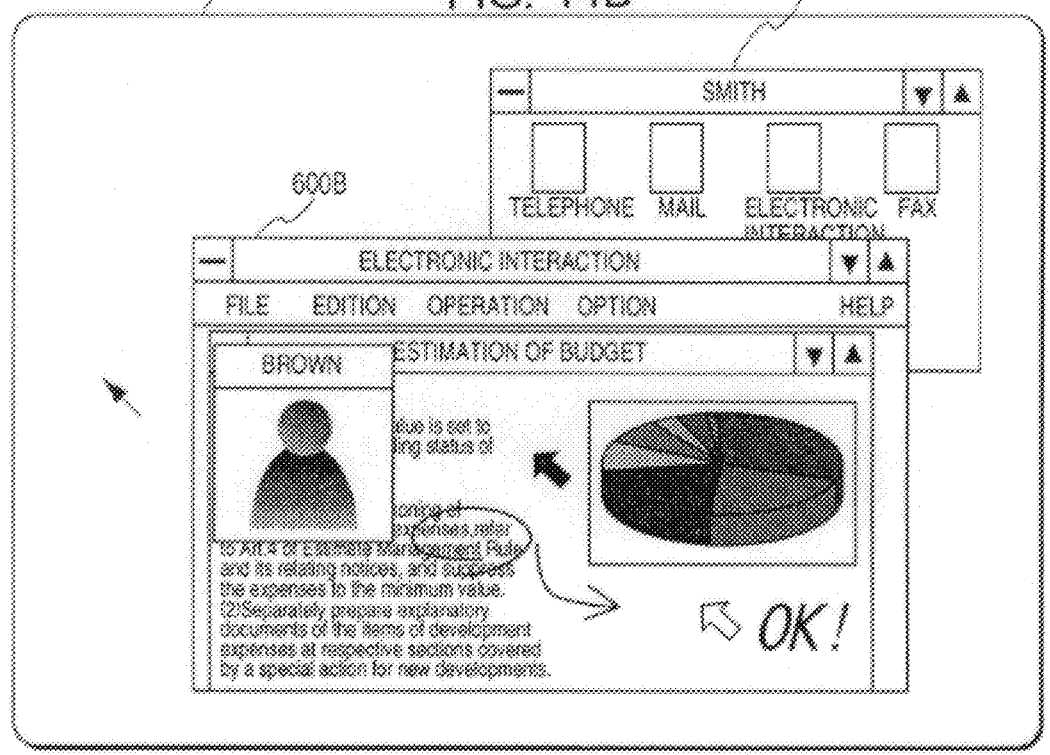

FIGS. 14A and 14B show the terminal screens when the result of the joint work is stored in a file. The file indicating window 1400 is displayed on the screen 400A, and the current display content of the joint work window 600A, the recording result of pictures, voice, operations as described later, etc. can be stored in a file with a indicated file name.

Figure 15A:
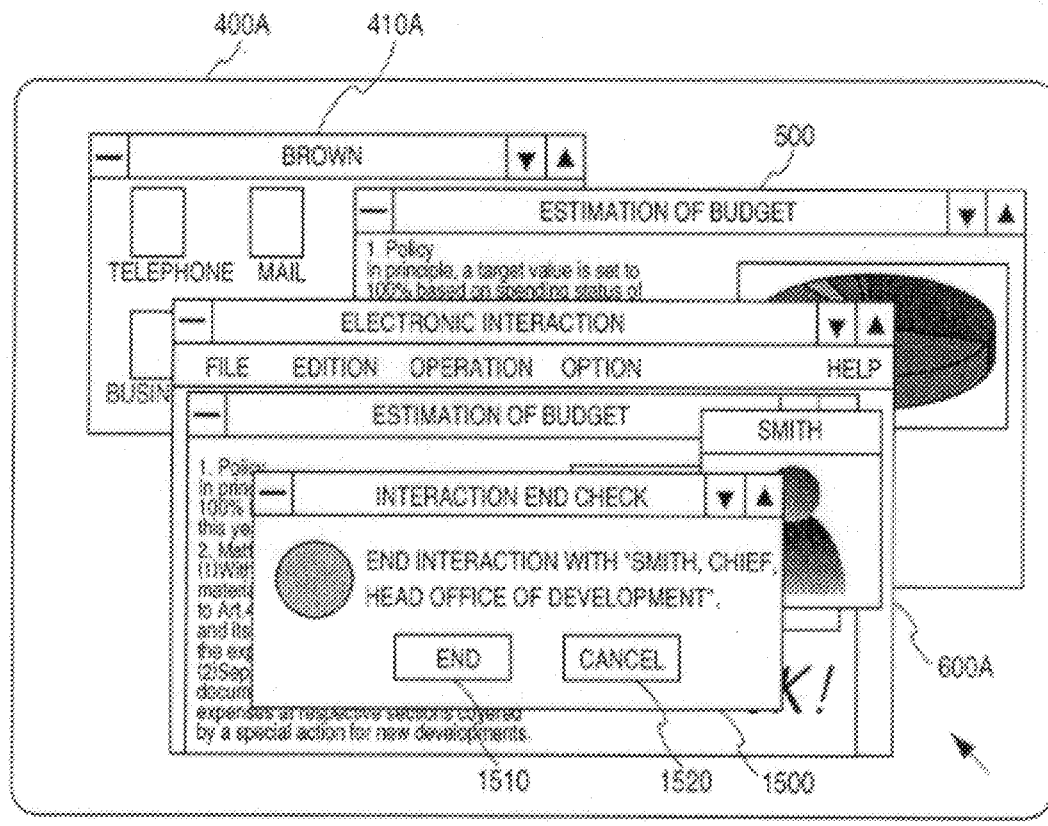
FIGS. 15A and 15B are illustrations showing views when an interaction end are confirmed, which is displayed on the terminal screen of the embodiment shown in FIG. 1.
Figure 15B:
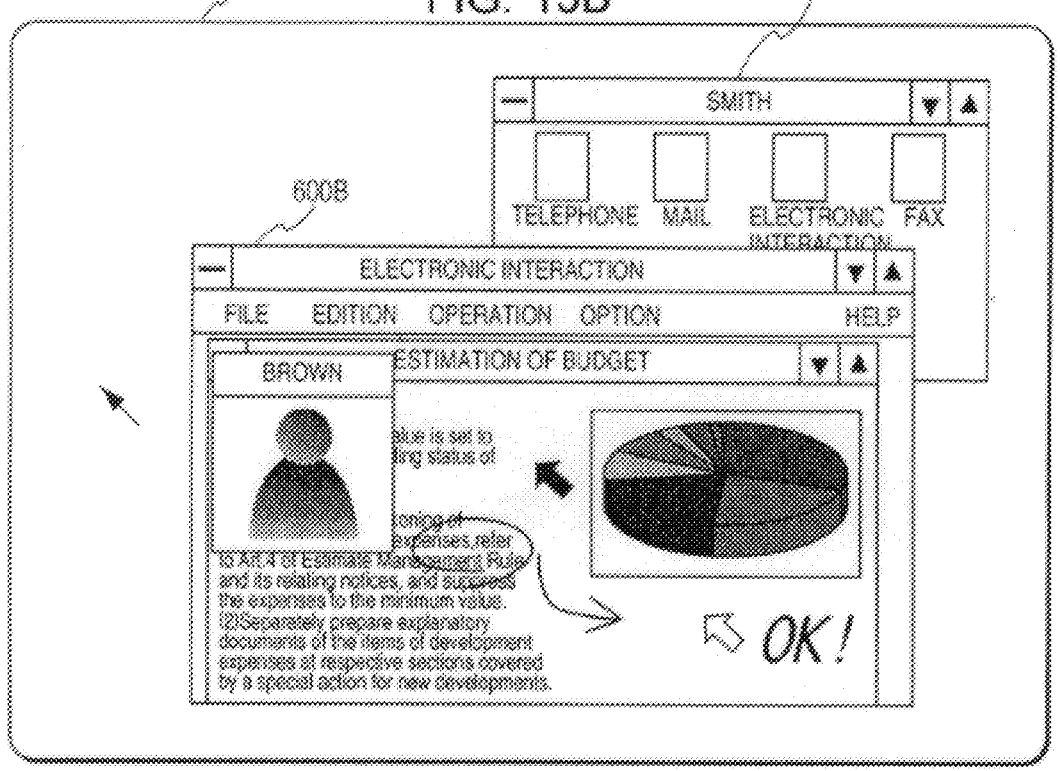

FIGS. 15A and 15B show the terminal screens when the joint work is finished. An interaction end check window 1500 is displayed on the screen 400A to inquire of the participant A about whether the joint work should be finished. At this time, if the end button 1510 is pushed, the connection with the participant B would be disconnected. If the cancel button 1520 is pushed, the joint work could be continued.

Figure 16A:
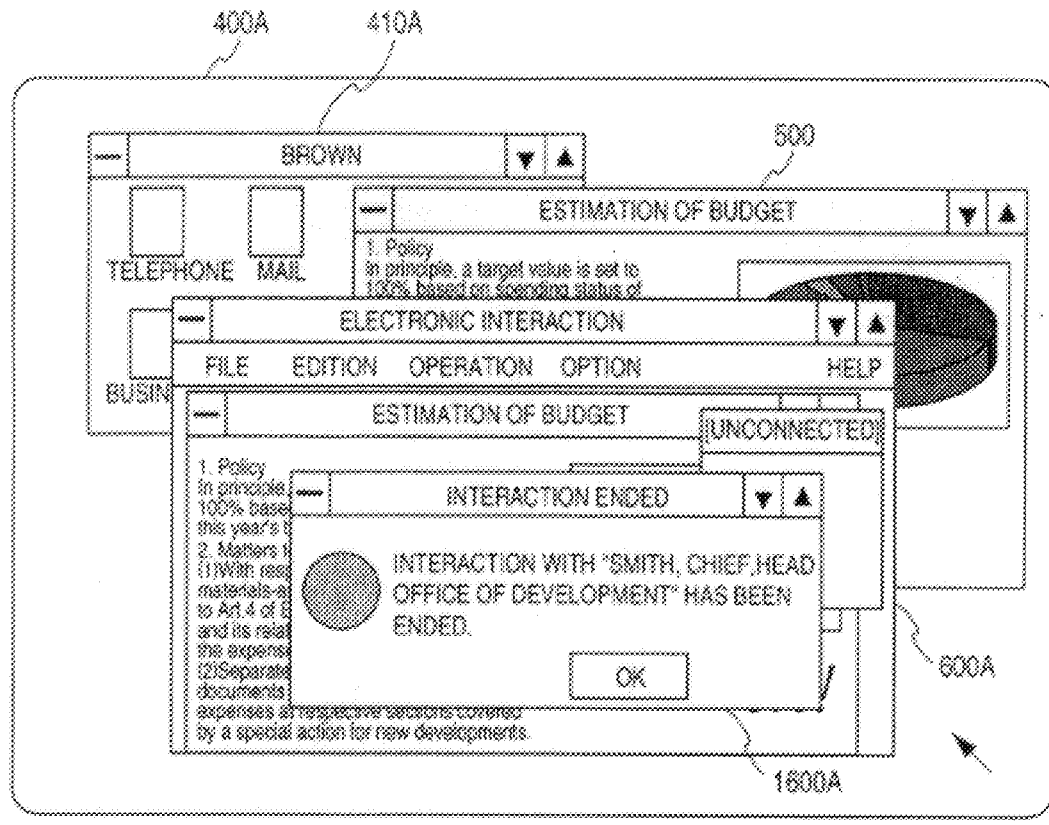
FIGS. 16A and 16B are illustrations showing views when the interaction end is noticed, which are displayed on the terminal screen of the embodiment shown in FIG. 1.
Figure 16B:
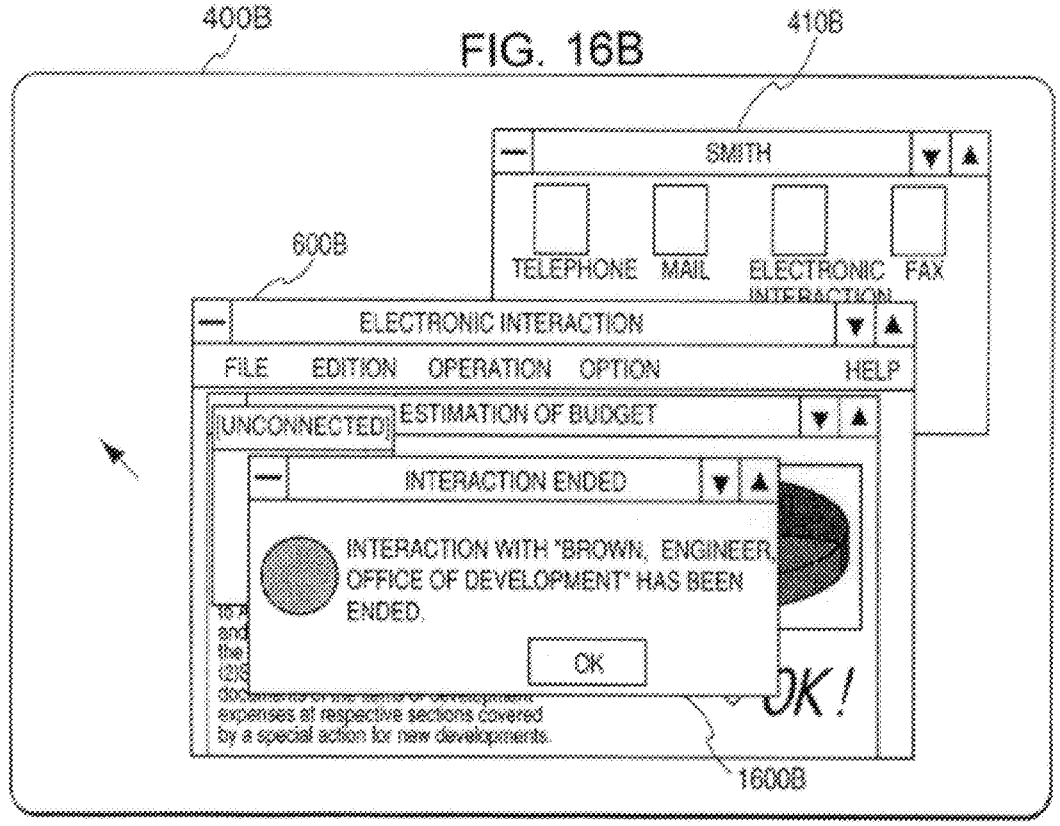

FIGS. 16A and 16B show the terminal screens when the end button 1510 is pushed to finish the joint work. On the screens 400A and 400B are respectively displayed the interaction end notifying windows 1600A and 1600B for indicating the disconnection.

The above description relates to the process flow for normal joint work. In a joint work case, there frequently occurs such a situation that the joint work cannot be performed on a real-time basis because a communication recipient is absent or very busy. Next, the functions which are supplied by the system of this embodiment in the above situation will be described.

Figure 17A:
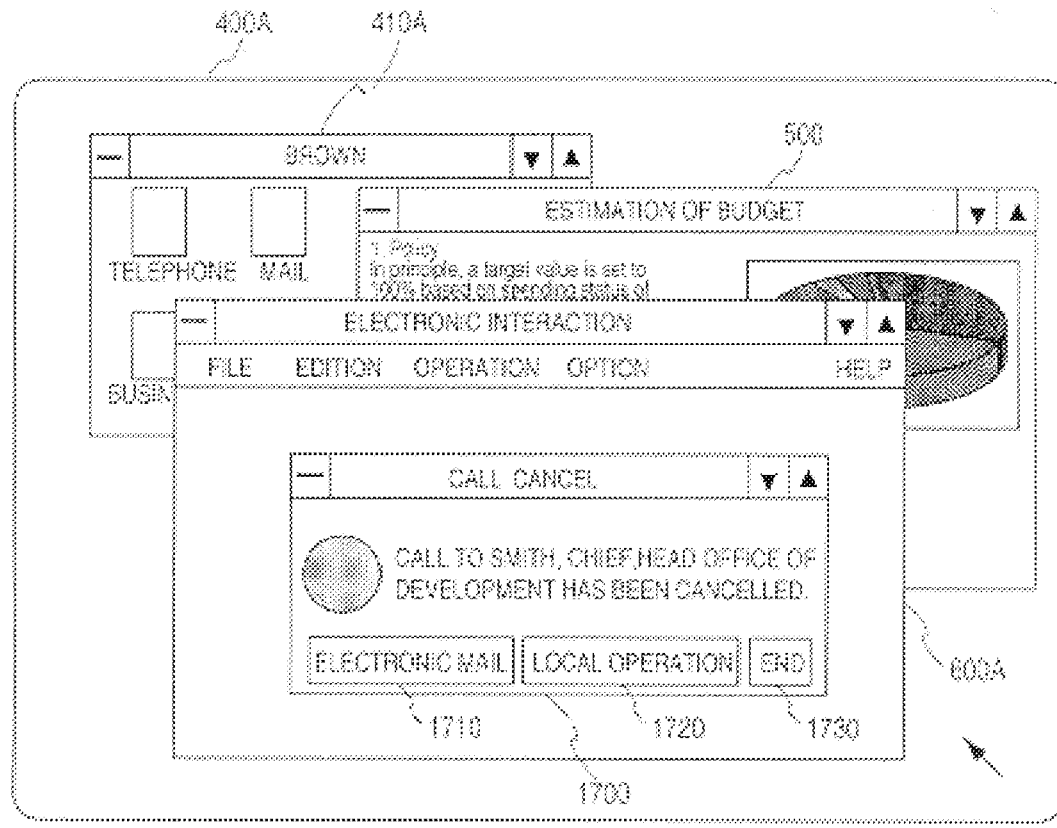
FIGS. 17A and 17B are illustrations showing views when a call is ceased, which are displayed on the terminal screen of the embodiment shown in FIG. 1.
Figure 17B:
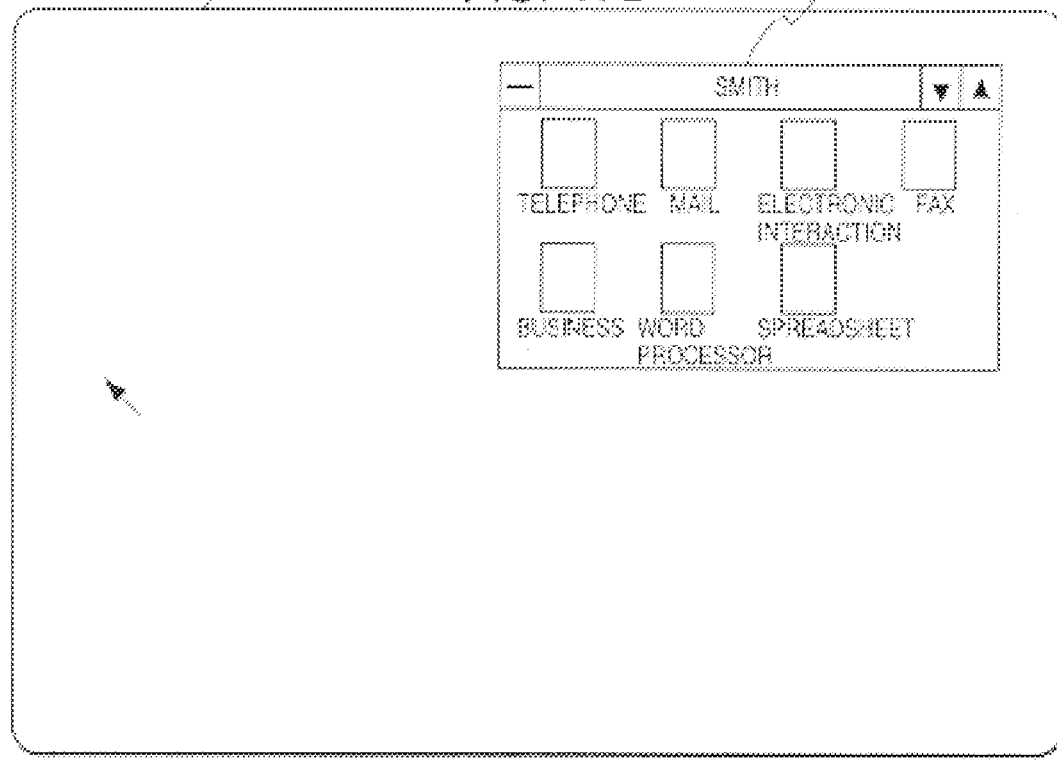

FIGS. 17A and 17B show the terminal screens when the calling is canceled because no response to the calling shown in FIGS. 8A and 8B is given from the communication recipient. The call canceling window 1700 is displayed on the screen 400A of the participant A. In this case, a selection of operation may be made among choices such as an operation of transmitting electronic mail by pushing an electronic mail button 1710, an operation of performing a local operation by pushing a local operation button 1720, and an operation of finishing with no operation by pushing an end button 1730.

When the electronic mail button 1710 is selected, the screen image is shifted to the electronic mail transmission screen image shown in FIGS. 13A and 13B, and electronic mail can be transmitted to the person who had been called or any address.

When the local operation button 1720 is selected, the local operation function which is the feature of the present invention is usable. With the local operation function, even when a communication sender is not connected to a communication recipient (i.e., in a local state), the communication sender can perform the same operation as in the case where the communication sender performs a real-time joint work while actually connected to the communication recipient. The local operation will be described in detail later.

Figure 18A:
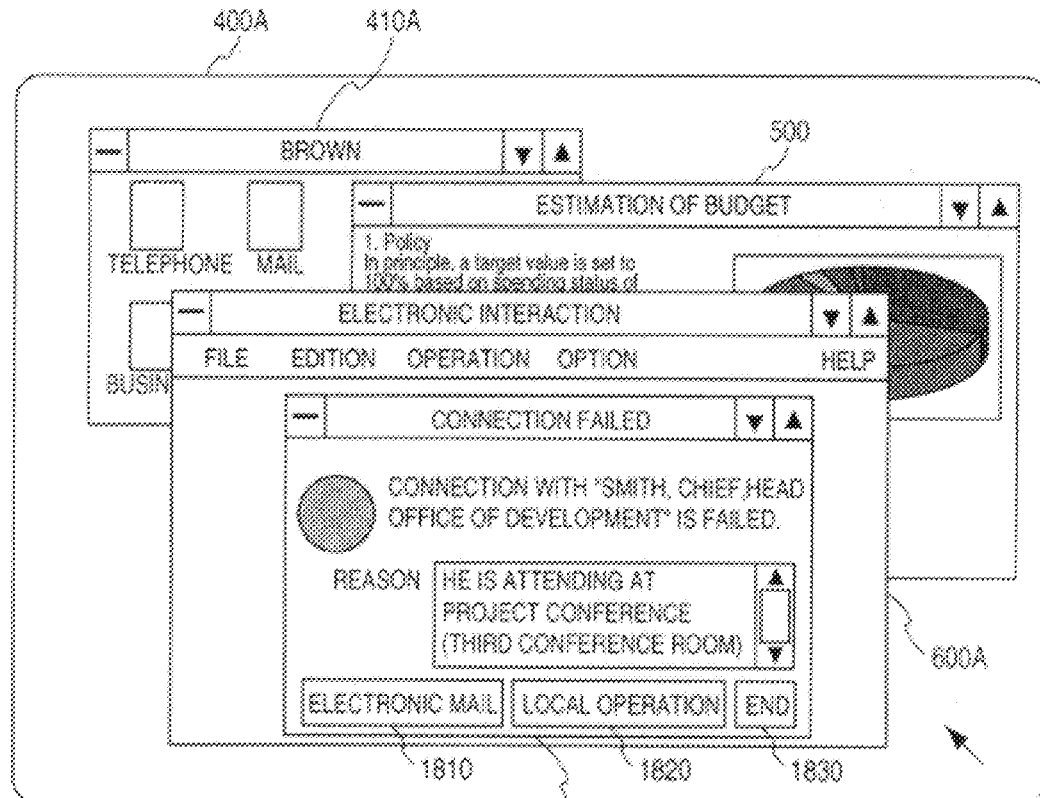
FIGS. 18A and 18B are illustrations showing views when the connection impossibility is noticed, which are displayed on the terminal screen of the embodiment shown in FIG. 1.
Figure 18B:
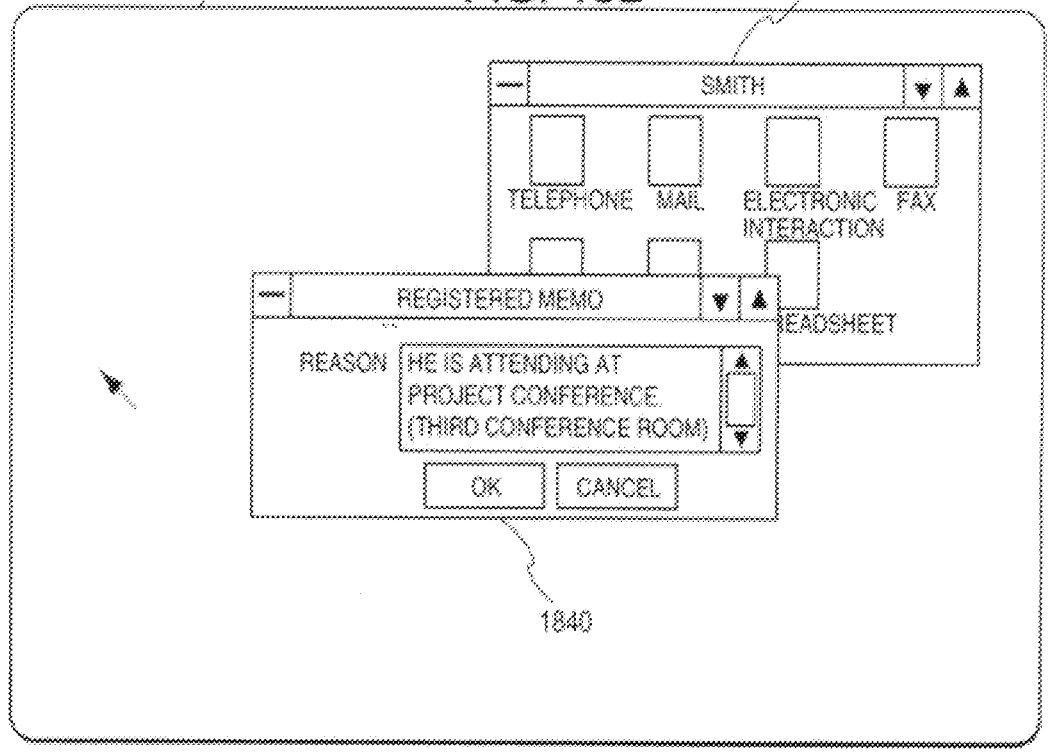

FIGS. 18A and 18B show screen images when no response to the calling is given from the communication recipient for some reason.

In this example, the participant B registers his absence in his terminal by using an absence register window 1840 in advance. With this operation, when the participant A afterwards calls the participant B, the connection failure notifying window 1800 is displayed on the screen of the participant A in accordance with the content registered in the absence register window 1840, whereby the participant A can know the absence of the participant B and select one of the electronic mail button 1810, the local operation button 1820 and the end button 1830 in the same manner as shown in FIGS. 17A and 17B.

Next, the local operation function which is the feature of the present invention will be described.

Figure 19:
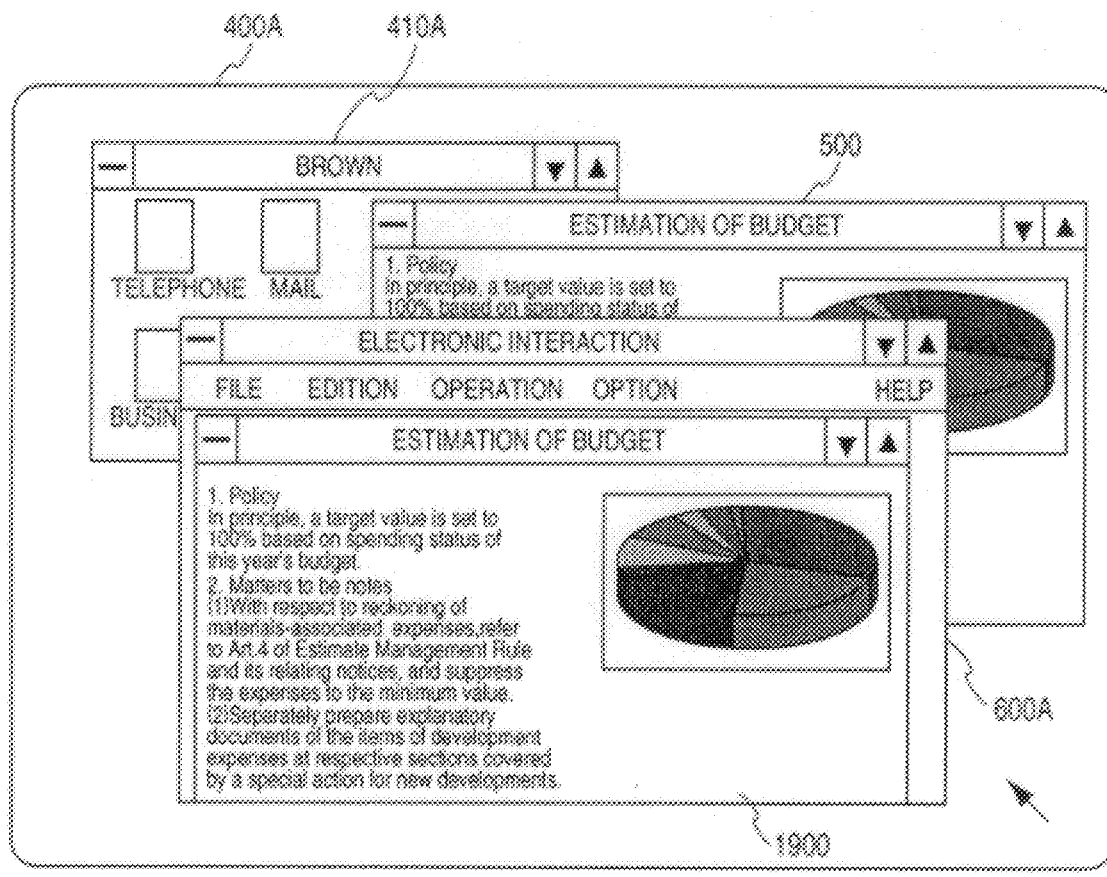
FIG. 19 is an illustration showing a view when a local operation is performed, which is displayed on the terminal screen of the embodiment shown in FIG. 1.

FIG. 19 shows the terminal screen 400A of the participant A when the local operation button is selected in a state shown in FIGS. 17A, 17B, 18A or 18B. In this example, after the joint work window 600A is displayed, the display content of the AP window 500 is taken in and displayed on a temporarily set common window 1900. At this time, although the participant A is not actually connected to another participant, the participant A can perform, in the temporarily-set common window 1900, all operations which can be performed under actual joint work, such as a telepointer operation, a telewriting operation, a comment attachment operation, etc.

Furthermore, all of these operations, containing pictures and sounds, are recorded or recordable together with timesequential time information, and afterwards they can be reproduced while mutually synchronizing the stored data. The specific process flow and data structure to achieve the local operation function as described above will be described in detail later.

Figure 20:
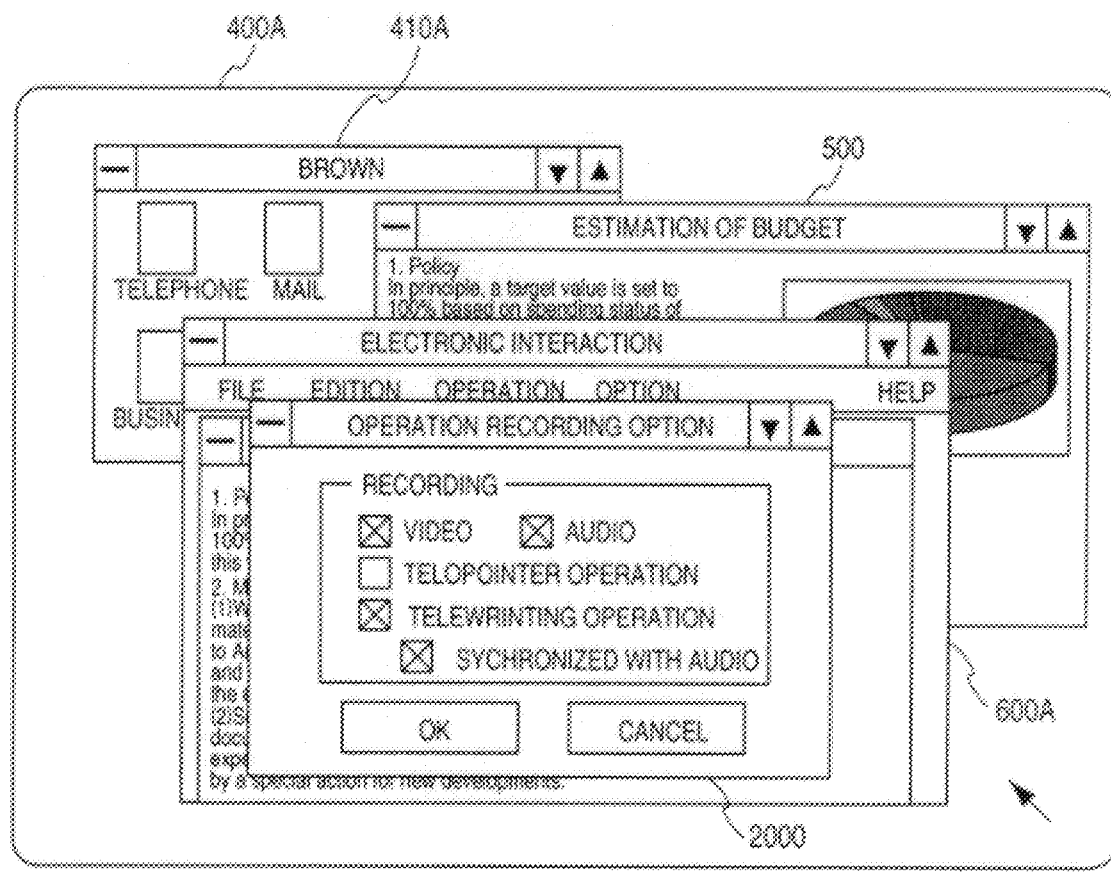
FIG. 20 is an illustration showing a view when an operation recording option is indicated, which is displayed on the terminal screen of the embodiment shown in FIG. 1.

FIG. 20 shows a screen image when options for recording are set in the local operation of this embodiment. An option setting window 2000 is displayed to receive instructions on the setting, such as whether pictures, voice, a telepointer operation and a telewriting operation should be recorded, and whether the voice and the pictures should be synchronized with each other when the recording is performed.

As described above, the participant can selectively instruct data to be recorded, such as only the voice, only the pictures or a combination thereof or the like if necessary, so that the participant can create efficient recording data in accordance with the purpose of the local operation. For example, the participant can give various instructions, such as, an instruction that no picture is necessary because the communication content is a unimportant one, an instruction that the recording of the telepointer operation, etc. is unnecessary because it is sufficient to display only the motion of objects.

Figure 21:
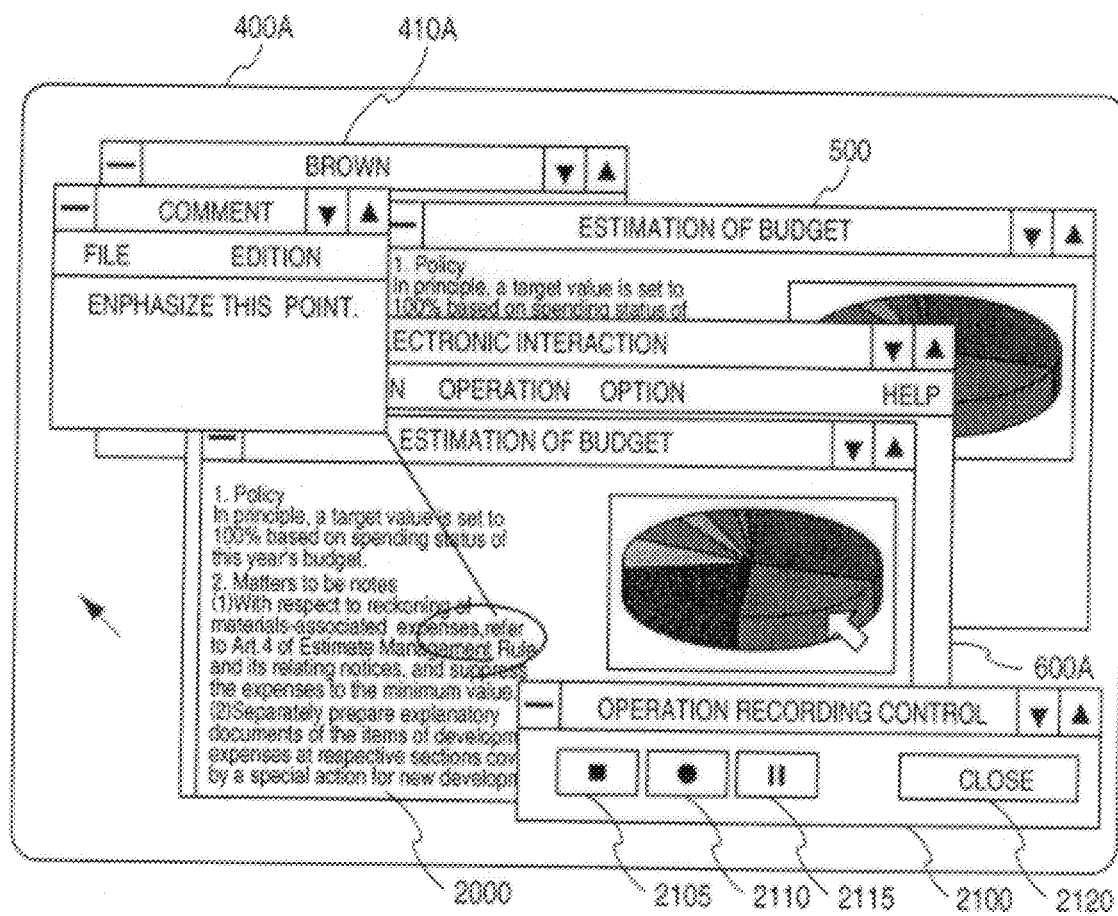
FIG. 21 is an illustration showing a view at an operation recording time, which is displayed on the terminal screen of the embodiment shown in FIG. 1.

FIG. 21 shows a screen image when local operations have been recorded. A recording control window 2100 is displayed on the screen, and a recording start or stop operation, a pause operation, etc. can be freely controlled by using a stop button 2105, a start button 2110, a pause button 2115, etc. When a close button 2120 is pushed, the recording control window 2100 is closed and the recording operation is finished.

Information thus recorded can be transmitted to any address by using the electronic mail transmission function shown in FIGS. 13A and 13B if necessary, or can be stored as a file in a user's disc by using the file storage function shown in FIGS. 14A and 14B.

Further, when a communication sender had tried to connect to a communication recipient to start joint work, and he could not connect to the communication recipient, the communication sender may select the local operation and then select the electronic mail transmission processing. In this case, the system is designed to enable the communication sender to automatically set the address of the communication recipient as a default value for the transmission address of the electronic mail.

Accordingly, the series of operation works as described above can be performed with a smaller amount of operational load, so that the communication sender can perform more efficient communication with the communication recipient.

In the conventional electronic mail system, text data or still files are transmitted. However, such a system is not applicable to such a situation where a user carried out a presentation on the screen and the presentation is transmitted as a file to a communication recipient through operations on the screen.

On the other hand, according to this embodiment, the user can directly transmit an aspect that various data in an AP are presented with voice and video images. Therefore, even when the user cannot connect to a communication recipient for some reason, he can sufficiently obtain an effect of a real-time communication. Further, the user can omit such a cumbersome task as newly creating sentences or a file for electronic mail or leave a message asking a communication recipient to connect him. Therefore, the user can speed up his work.

Figure 22:
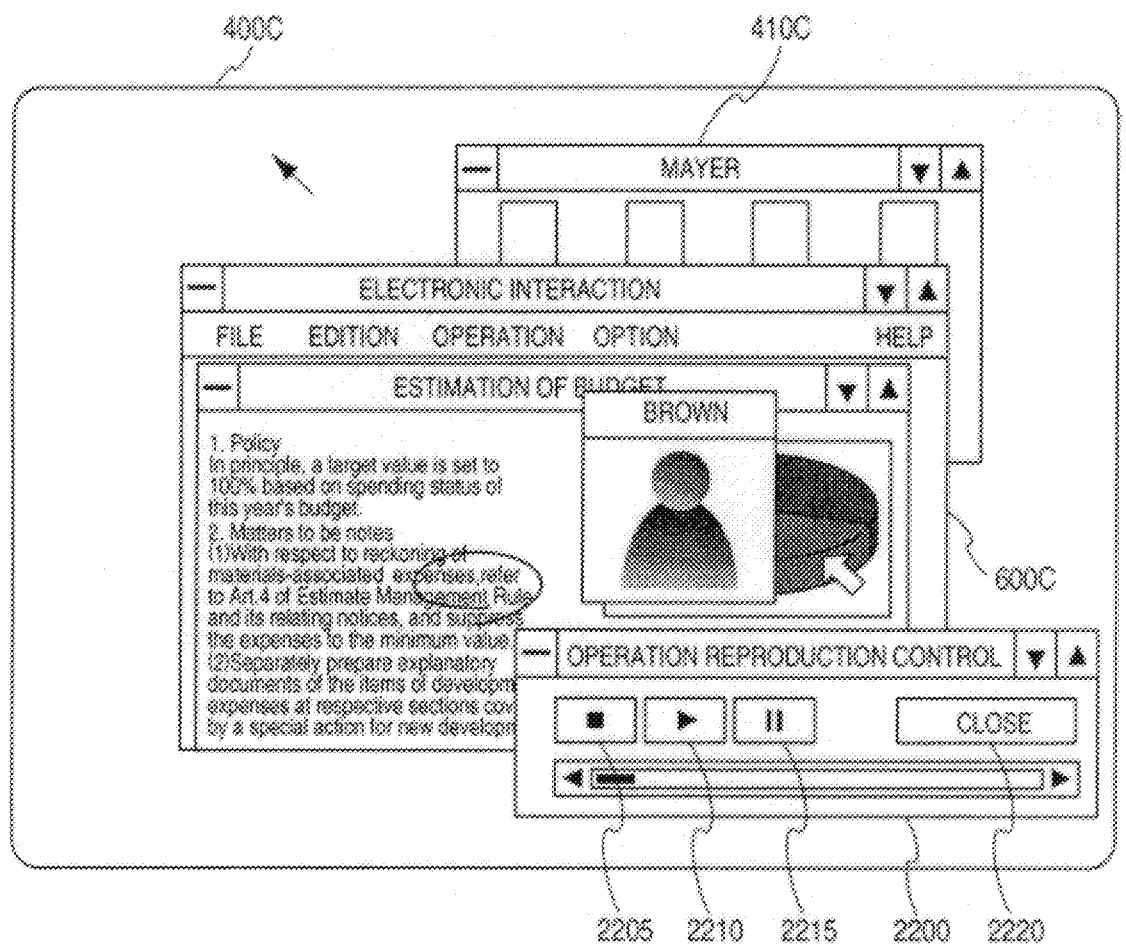
FIG. 22 is an illustration showing a view at a reproduction control time, which is displayed on the terminal screen of the embodiment shown in FIG. 1.

FIG. 22 shows a screen image under a reproducing operation of the recording data of the local operation which are created in the manner as described above and received at the communication recipient. In this case, a reproduction control window 2200 is displayed, and the reproduction start or stop operation, the pause operation, etc. can be freely controlled by using a stop button 2205, a start button 2210, a pause button 2215, etc. If a close button 2220 is pushed, the reproduction control window 2200 is closed and the reproduction is finished.

As described above, a receiver who receives the recording data created by the local operation of the sender can see or listen to not only normal still mail data, but also pictures and voice recorded by the transmitter and the telepointer and telewriting operations which are synchronized with the pictures and voice. As a result, any user can achieve an efficient communication as if he directly communicated with another user on a real-time basis. In addition, for reproduction of recording data, a user can freely reproduce the data at a time which is convenient to him because it is not necessarily required for the user to connect to other users.

Next, the process flow of the electronic interaction control program of the system according to this embodiment will be described. As shown in FIG. 2, this program is stored in the main memory 210, and the CPU 205 executes this program to perform the processings shown in the following flowcharts. Furthermore, the electronic interaction control program can be stored in a memory medium, for example the disc device 235 shown in FIG. 2, which a computer can read or read/write, such as a hard disc device, a floppy disc device or the like.

The overall process flow of the program will be described with reference to the flowcharts of FIG. 23.

Figure 23:
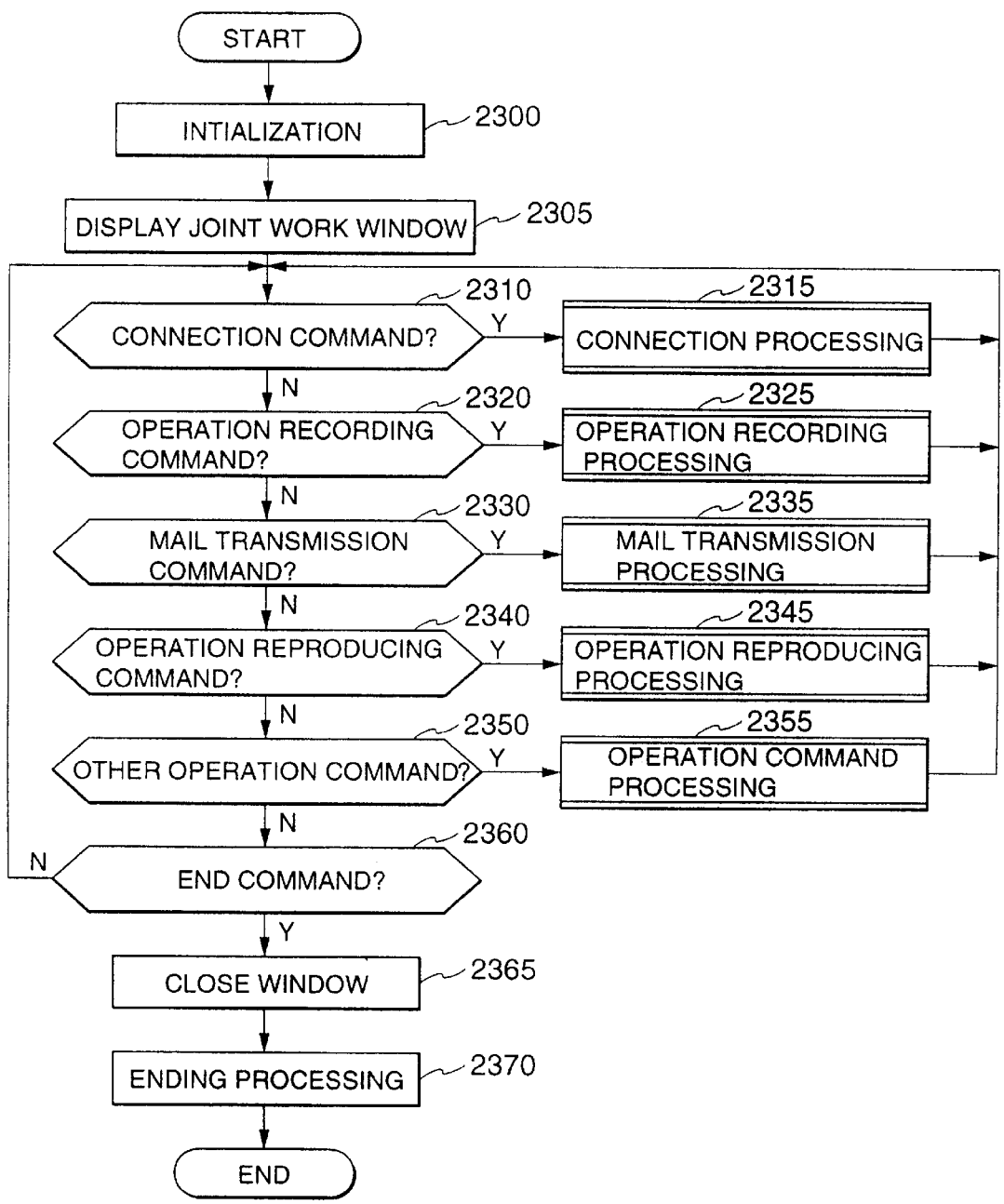
FIG. 23 is a flowchart showing a process flow of an electronic interactive control program.

In the process flow shown in FIG. 23, upon start of the electronic interaction control program, initialization processing is first performed (step 2300), and then the joint work window is displayed (step 2305). Subsequently, an input from a user to the joint work window is monitored to perform various processing corresponding to input data.

If the input is a connection command (step 2310), the connection processing is performed (step 2315). If the input is an operation recording command (step 2320), the operation recording processing is performed (step 2325). If the input is a mail transmission command (step 2330), the mail transmission processing is performed (step 2335). If the input is an operation reproducing command (step 2340), the operation producing processing is performed (step 2345). If the input is another operation command (step 2350), the operation command processing is performed (step 2355). If the input is not an end command (step 2360), the process returns to the monitoring operation of the input from the user.

If the end command is input, the joint work window is closed (step 2365), and the program end processing is performed (step 2370).

Figure 24:
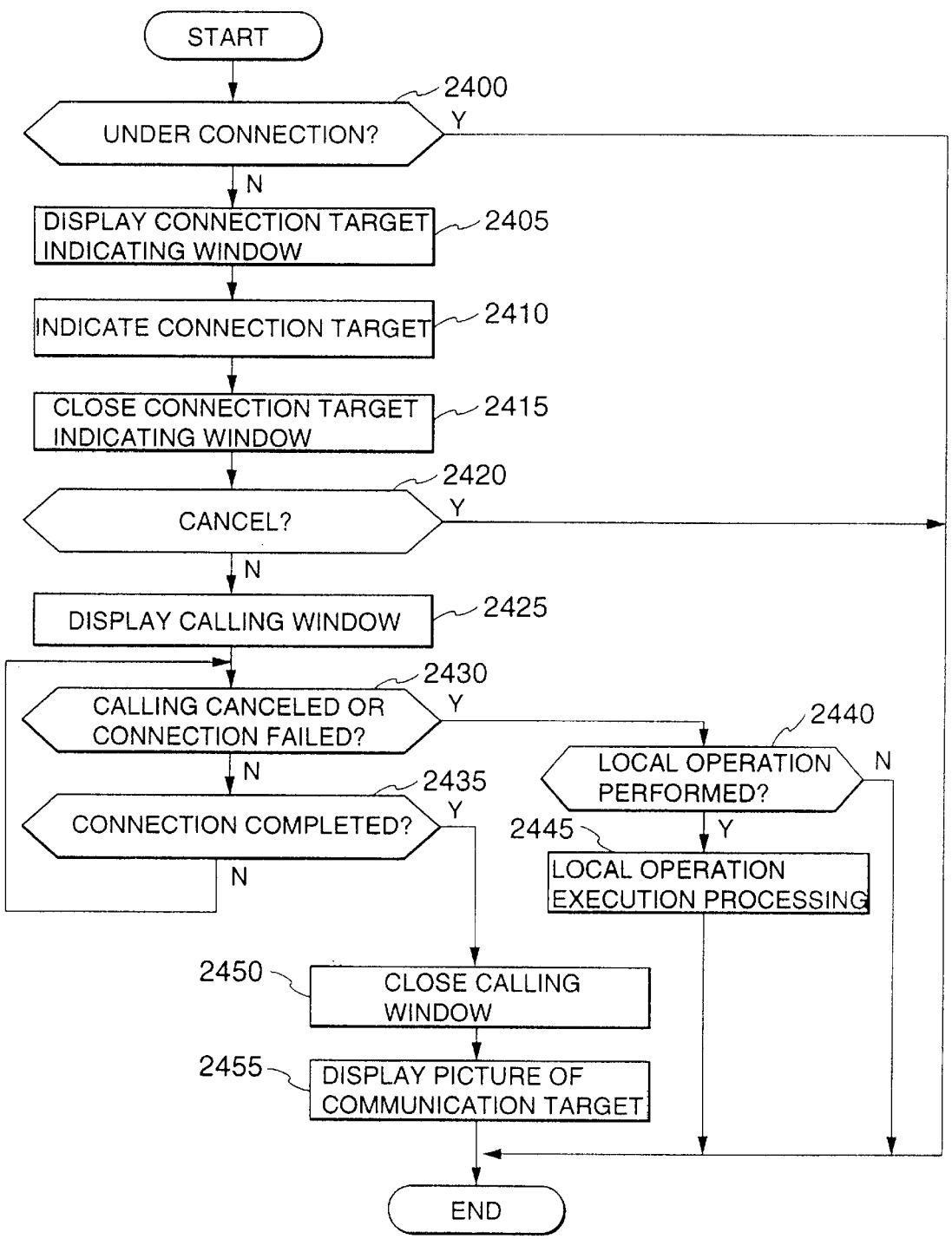
FIG. 24 is a flowchart showing a process flow of connection processing 2315 of FIG. 23.

Next, the details of the process flow of the connection processing 2315 will be described with reference to FIG. 24.

In the connection processing, it is first checked whether the connection is now in progress (step 2400). If the connection has been already established, the processing is ended. If the connection has not yet been established, the connection target indicating address is displayed (step 2405), and a connection target indication is received from the user (step 2450) to close the connection target indicating window (step 2415).

Subsequently, it is checked whether the user cancels the connection (step 2420). If the user cancels the connection, the processing is ended. If the user does not cancel, the calling window is displayed (step 2425). Subsequently, it is repeated to check whether an instruction of canceling the call is given or the connection failure is judged (step 2430) until the connection has been completed (step 2435).

If the call cancellation or the connection failure is judged, it is selected whether the local operation is performed (step 2440). If the local operation is selected, the local operation executing processing is performed (step 2445). In this system, even in the local operation, the terminal of the communication sender can perform the same operation as the case where it does joint work in cooperation with another terminal.

If the connection has been completed (step 2435), the calling window is closed (step 2450), and the picture of the communication recipient is displayed (step 2455).

Figure 25:
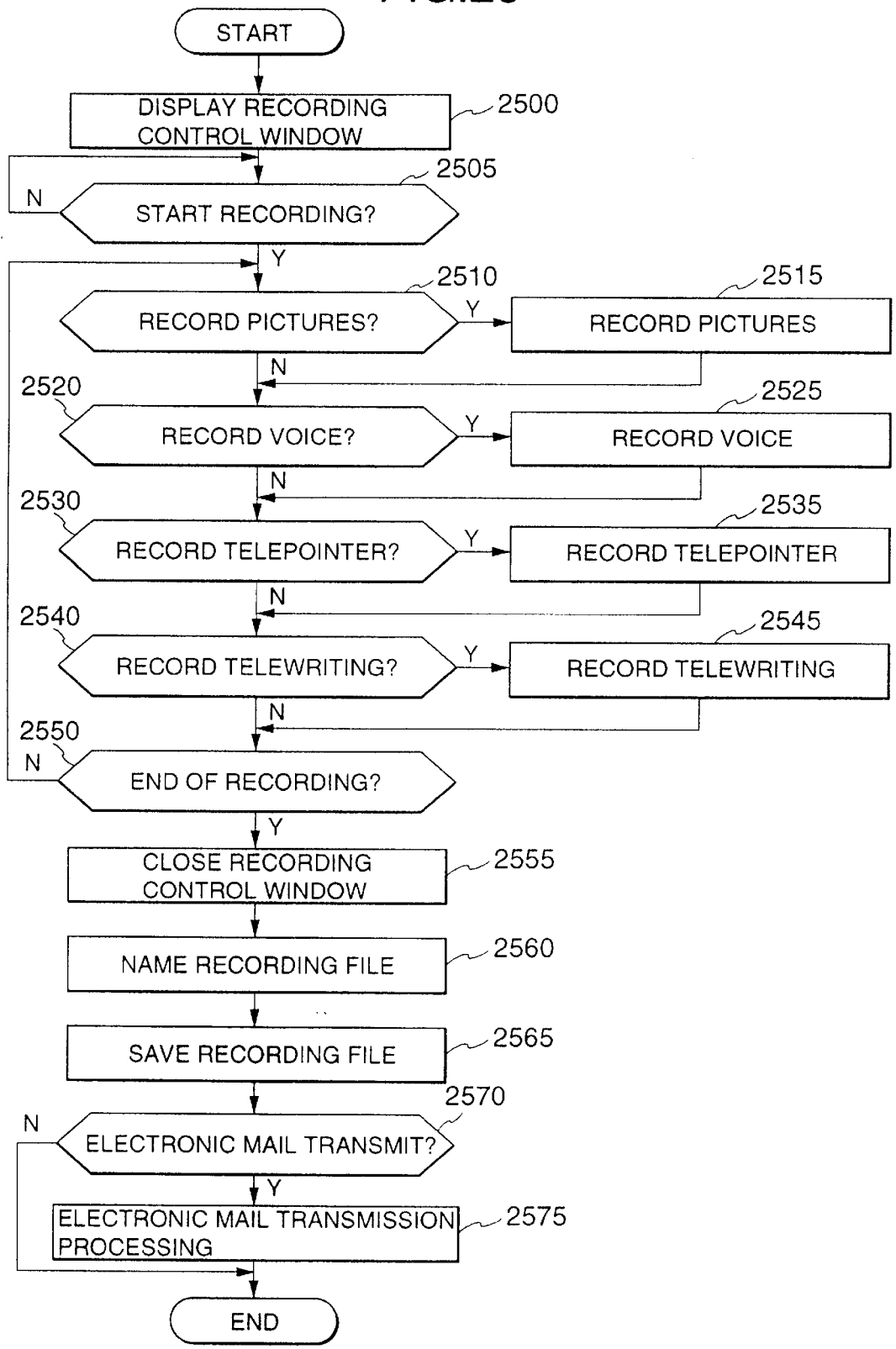
FIG. 25 is a flowchart showing a process flow of operation recording processing 2325 of FIG. 23.

Next, the process flow of the operation recording processing 2325 will be described with reference to a flowchart of FIG. 25.

First, the recording control window is displayed (step 2500), and then the process waits until recording start is instructed on the recording control window (step 2505). Upon start of the recording, the setting of a recording option is checked. If the setting indicates a picture recording operation (step 2510), pictures are recorded (step 2515). If the setting indicates a voice recording operation (step 2520), voice is recorded (step 2525). If the setting indicates a telepointer operation recording operation (step 2530), the telepointer operation is recorded (step 2535). If the setting indicates a telewriting operation (step 2540), the telewriting operation is recorded (step 2545). This process is repeated until the recording end is instructed in the recording control window (step 2550).

Here, the telepointer and the telewriting are used as a recordable operation. The operations which can be recorded and supports the joint work in the present invention are not limited to the above operations, and the system may be designed so that other kinds of operations are recordable.

Further, the system may be designed so that when joint work for two or more participants is recorded, the operations of all the participants are not recorded, but the operations of only those participants which are specified beforehand are recorded.

When the recording is ended, the recording control window is closed (step 2555), and an indication of a recording file name is received from the user (step 2560), and the recording file is stored in a disc (step 2565). Further, an instruction as to whether the recording file is transmitted by using an electronic mail is received (step 2570). If the electronic mail is transmitted, the electronic mail transmission processing is performed (step 2575). The electronic mail transmission processing is performed according to the processing shown in FIG. 26, for example.

Figure 26:
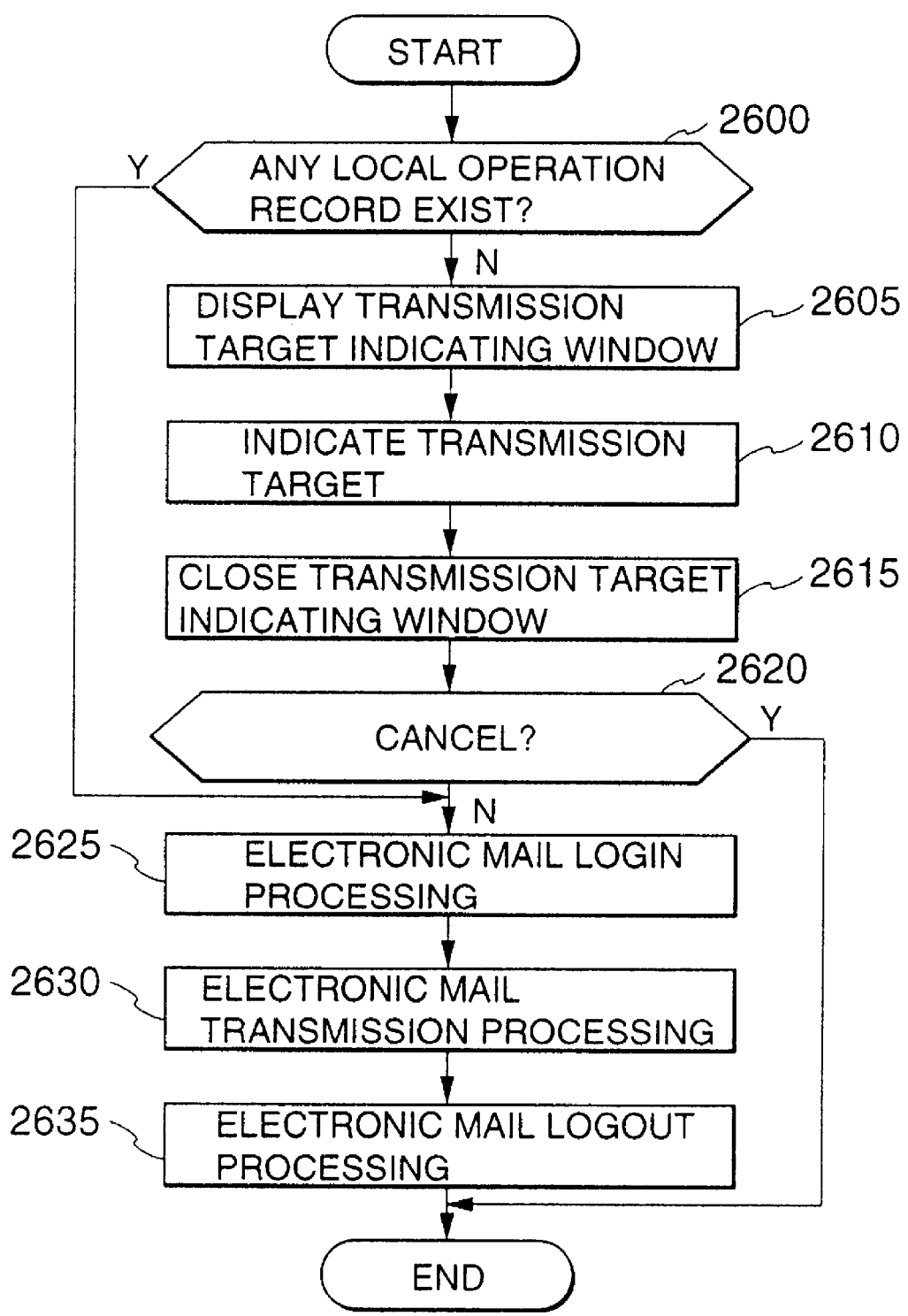
FIG. 26 is a flowchart showing a process flow of electronic mail transmission processing 2335 of FIG. 23.

The process flow of the electronic mail transmission processing 2335 will be described with reference to a flowchart of FIG. 26.

First, it is checked whether the execution of the local operation (see the step 2445 of FIG. 24) is recorded within a predetermined time before entering this processing (step 2600). If there is no local operation recording, the transmission target indicating window is displayed (step 2605), a transmission target indication by the user is received (step 2610), and the transmission indicating window is closed (step 2615). Subsequently, it is checked whether the user cancels the mail transmission (step 2620). If the user instructs the cancel, the processing is finished. If he does not cancel or if it is judged whether there is any local operation recording in step 2600, the electronic mail login processing is performed (step 2625), the electronic mail transmission processing is performed (step 2630), and the electronic mail logout processing is performed (step 2635).

Figure 27:
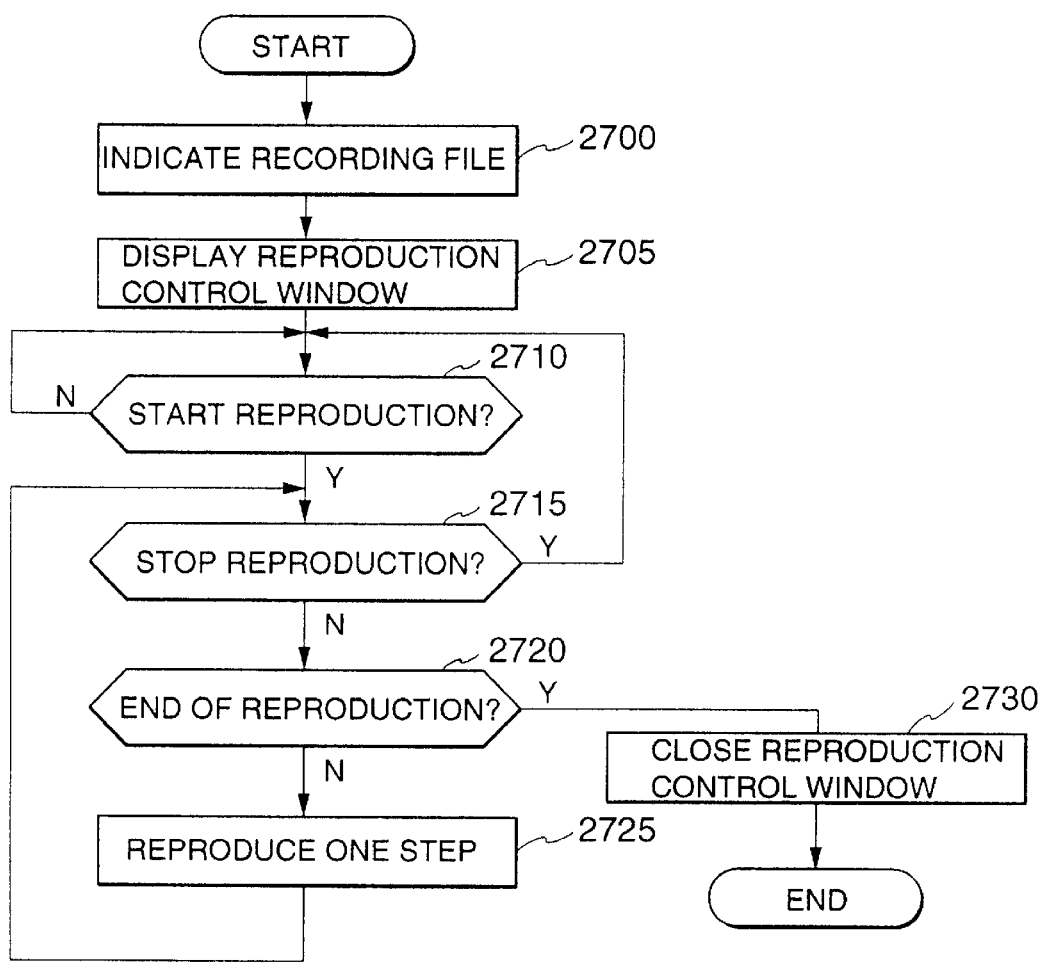
FIG. 27 is a flowchart showing a process flow of operation reproduction processing 2345 of FIG. 23.

Next, the process flow of the operation reproducing processing 2345 will be described with reference to a flowchart of FIG. 27.

First, an indication of a recording file to be reproduced is received from the user (step 2700), and the reproduction control window is displayed (step 2705). The process waits until an instruction of starting the reproduction is given in the reproduction control window (step 2710).

Upon start of the reproduction, one-step reproduction of an operation record (step 2725) is repeated until an instruction of pausing or finishing the reproduction is given. If the pause of the reproduction is instructed (step 2715), the process waits for the start of the reproduction again. If the finish of the reproduction is instructed (step 2720), the reproduction control window is closed (step 2730).

Figure 34:
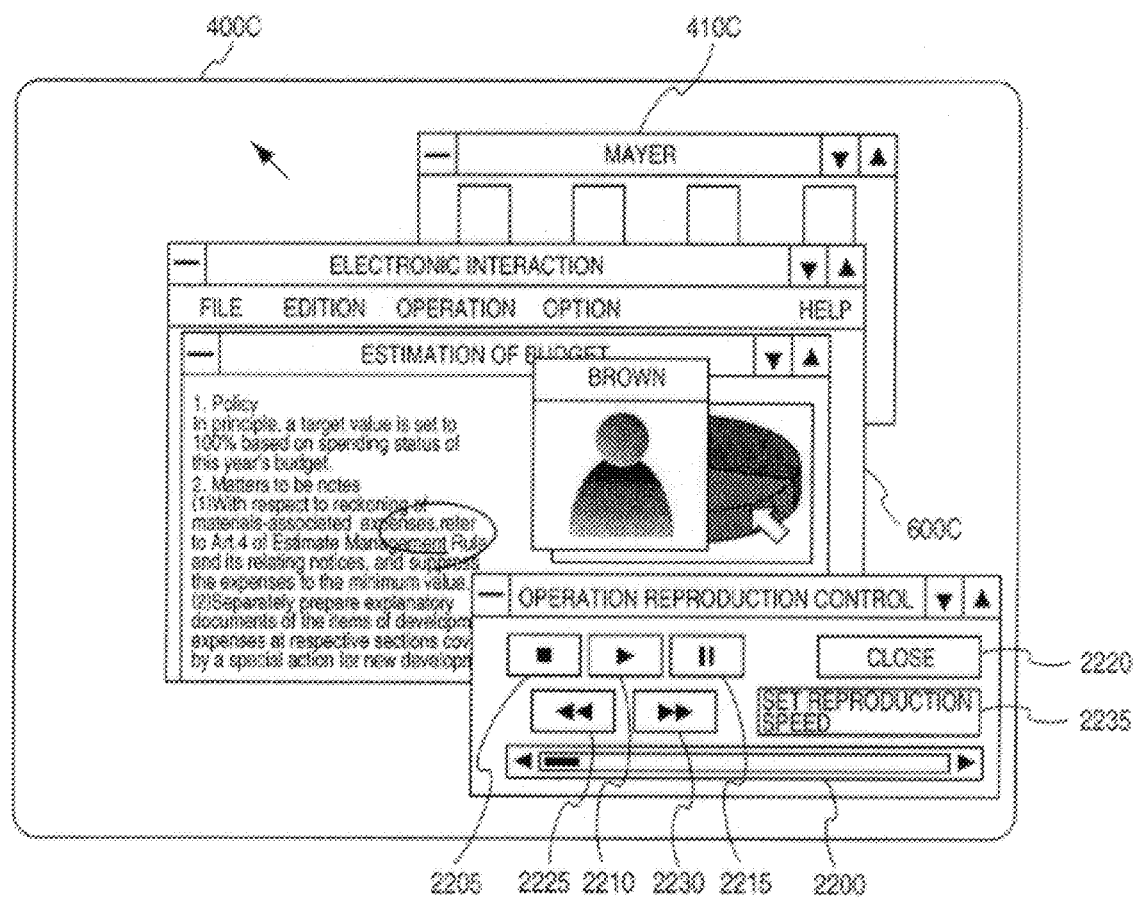
FIG. 34 is an illustration showing another embodiment of the reproduction control window.

Instead of the window shown in FIG. 22, a reproduction control window 2200 shown in FIG. 34 may be displayed as the reproduction control window. The reproduction control window 2200 shown in FIG. 34 is provided with a rewind button 2225, a forward button 2230 and a reproduction speed setting button 2235 for setting a reproduction speed to any value in addition to the stop button 2205, the start button 2210 and the pause button 2215. As described above, the reproduction control window 2200 may be designed to receive various instructions for reproduction, and the reproduction processing is performed in accordance with each of the instructions.

Furthermore, in the embodiment as described above, the system is designed so that all the recorded data are reproduced. However, the system may be designed so that an instruction on the kind of data to be reproduced is received beforehand and the reproduction of the selected data is performed in accordance with the instruction. Further in such a situation that plural participants enter joint work, not only the data based on operations of all the participants are reproduced, but also only the data based on operations of some specified participants may be reproduced.

Figure 28:
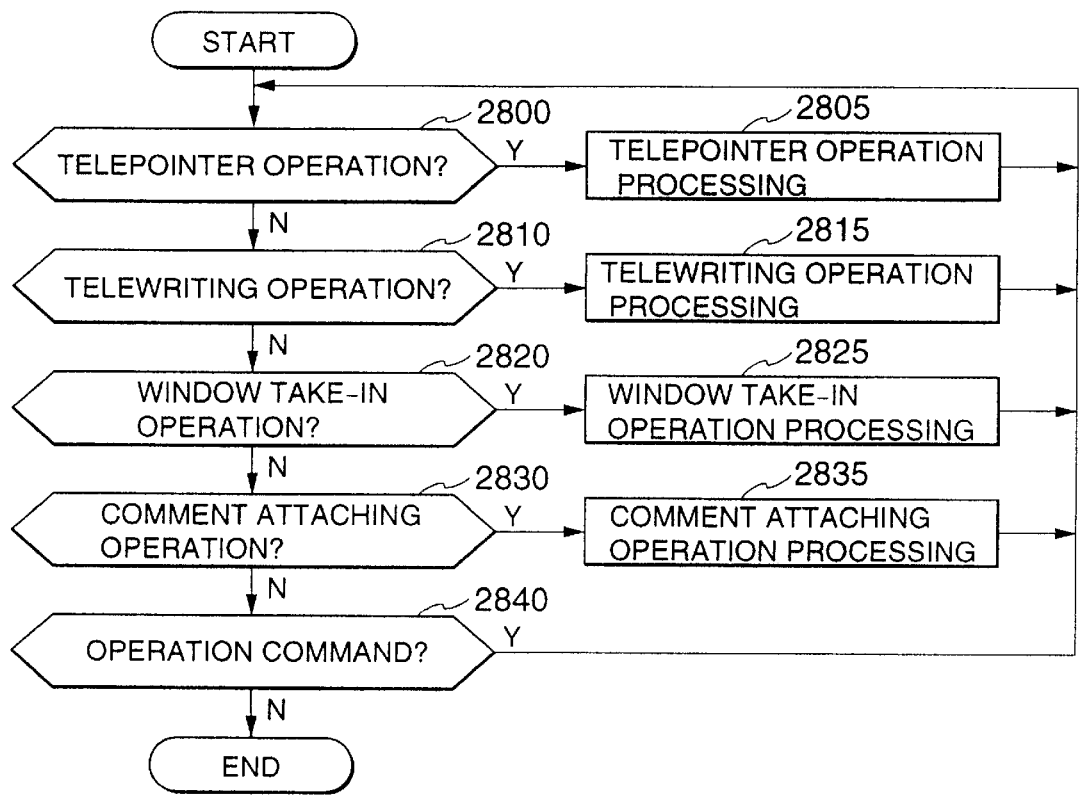
FIG. 28 is a flowchart showing a process flow of operation command processing 2355 of FIG. 23.

The process flow of the operation command processing 2355 will be described in detail with reference to a flowchart of FIG. 28.

If an input operation is a telepointer operation (step 2800), the processing of a telepointer shifting operation or the like is performed (step 2805). If it is a telewriting operation (step 2810), the processing of a telewriting drawing operation or the like is performed (step 2815). If it is a window capture operation (step 2820), the operation of a window image capture operation or the like is performed (step 2825). If it is a comment attachment operation (step 2830), the processing of a comment attaching operation is performed (step 2835). Thereafter, if the operation command is input, the processing as described above is repeated again (step 2840).

Commands other than the operation commands as described above may be recognized as operation commands to perform the corresponding processing.

In this embodiment, when the result of the joint work or local operation is recorded, both the telepointer and the telewriting operation are recorded as time information together with pictures and voice.

A format of information which is recorded through a joint work or a local operation will be described hereunder. These recording data represent a data format when they are stored in a file or transmitted by electronic mail. In the following description, the data format when it is stored as a file will be described hereunder, however, the same format is also used when electronic mail is transmitted to any address during execution of the joint work or local operation.

Figure 29:
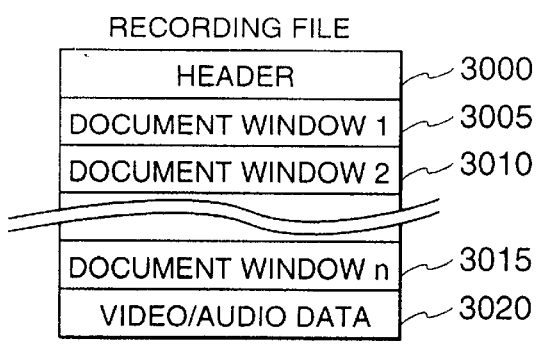
FIG. 29 is an illustration showing a construction of a recording file which is created under a joint work or a remote operation in the embodiment shown in FIG. 1.

FIG. 29 shows the overall structure of a recording file. First, a header 3000 is located at the head, and subsequently plural document window data of 3005, 3010 to 3015 are located in this order. The document window is defined as a common window which is shared among participants during a joint work, or a window which is used during the local operation. Finally, so-called real-time data such as video or audio data 3020, etc. are stored.

Figure 30:
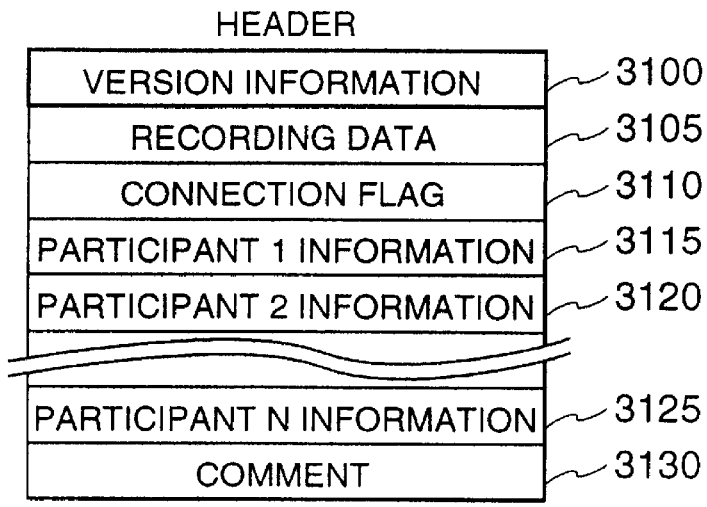
FIG. 30 is an illustration showing a header construction of a recording file of FIG. 29.

FIG. 30 shows the data format at the header portion in FIG. 29. Version information 3100 is stored at the head to enable a recording file to be used among electronic interaction control programs of different versions. Subsequently, a recording date 3105 on which the recording file was created is stored. Further, a connection flag 3110 is stored as additional information which represents whether the joint work or the local operation was in progress when the recording file was created. Thereafter, plural kinds of participant information from 3115 to 3125 which are associated with the recording file are stored. Finally, comment information 3130 on the recording file is stored.

Figure 31:
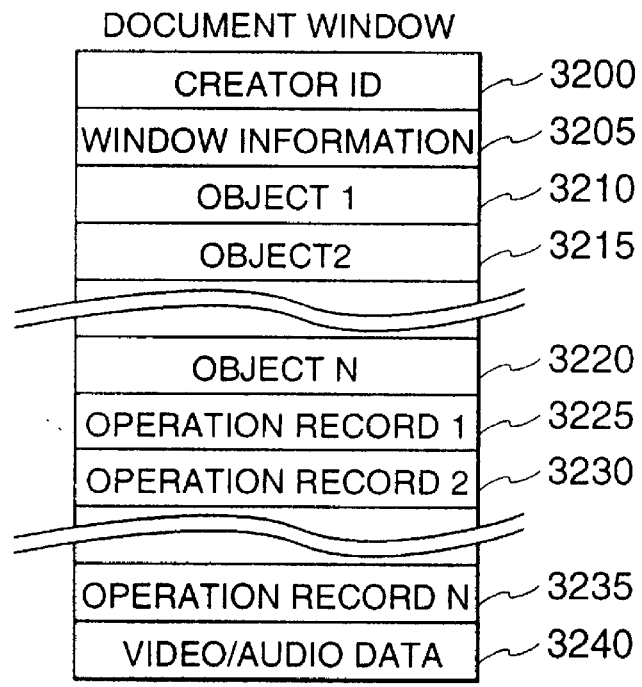
FIG. 31 is an illustration showing a data construction of a document window of the recording file of FIG. 29.

FIG. 31 shows a data format in the document window data portion in FIG. 29. ID information 3200 representing a creator who creates this document window is stored at the head. The ID information 3200 is associated with the participant information 3115 to 3125 in the header. Subsequently, window information 3205 containing information on the display position, the size and the overlap order of the document windows is stored. Thereafter, plural kinds of drawing object information from 3210 to 3220 are stored. The drawing object is defined as an object which is created by using the window image capture function or the telewriting function, and it contains data such as figures or sentences which are taken from an AP.

Furthermore, subsequently to the object information, operation records from 3225 to 3235 are stored. The operation record is defined as a record of coordinates, etc. associated with an operation which is performed on a document window by using the telepointer function or the like. Finally, video/audio data which are associated with the document window are added.

FIG. 32 shows a data format of a rectangular object as an example of the drawing object information of FIG. 31. In this embodiment, drawing object information of another format can be treated in the same manner as the rectangular object as described below.

In this case, ID information 3300 representing a creator who created this rectangular object is first stored. Subsequently, object type identifying information 3305 representing the type of this object is stored. In this embodiment, a value representing a rectangular object is stored.

Subsequently, a line attribute 3310, a paint-out attribute 3315, a upper-left coordinate 3320, and a lower-right coordinate 3325 are stored. Subsequently, a comment flag 3330 representing whether there is a comment associated with this object, comment information 3335 describing the display position and the size of a comment if the comment is judged to exist, and a comment character array 3340 are stored. Further, a voice comment flag 3345 representing whether there is a voice comment associated with the object and a voice comment 3350 when there is any voice comment, are added.

FIG. 33 shows a data format of the telepointer operation record as the operation record in FIG. 31. In this embodiment, the same format as described below is applicable to another type operation record. However, it is needless to say that the present invention is not limited to this data format, and the data format may be determined for every operation record type.

In this embodiment, ID information 3400 representing a creator who created this telepointer operation record is stored. Subsequently, object type identifying information 3405 representing the type of the operation record is stored. In this embodiment, a value representing a telepointer operation record is stored.

Subsequently, a line attribute 3410 of the telepointer operation record, a paint-out attribute 3415 and a set of a coordinate and a time stamp representing the time when the coordinate is pointed are stored. That is, in the case shown in FIG. 33, a first coordinate 3420, a time stamp 3425 representing the time when the first coordinate 3420 is pointed, a second coordinate 3430, a time stamp 3435 representing the time when the second coordinate 3430 is pointed, etc. are stored in this order until a coordinate 3445 and its time stamp are finally stored, thereby storing N sets of coordinates and time stamps.

By recording data having the data formats as shown in FIGS. 29 to 33, all of the pictures, the voice, the telepointer operation and the telewriting operation can be recorded together with time information associated with these data.

According to this embodiment, when a user cannot connect to his communication recipient for some reason, he performs such a local operation as to make a presentation with pictures and/or voice as if he directly gave the presentation before the communication recipient, and records the result of the local operation as a recording file and/or transmits the result by electronic mail. Accordingly, the communication recipient who receives the recording file can watch and listen to the pictures, voice or operations as if he performed joint work with the recorder (communication sender).

As a result, the desktop video conference system suitable for real-time joint work support and a tool such as electronic mail suitable for message exchange which does not need real-time processing, can be used in combination, thereby achieving an excellent operation performance which has not been achievable in the conventional conference system.

In the conventional real-time joint work support system, a user cannot perform any joint work if he cannot connect to another user. However, according to this embodiment, the local operation as described above brings about the great effect that a user (communication sender) can easily transmit the result of his local operation to a communication recipient in the same way as transmission of electronic mail.

For example, before connecting to the communication recipient, the communication sender performs the local operation and transmits created recording data to the communication recipient in advance. Thereafter, the communication sender actually connects to the communication recipient to recommend joint work to the target. Therefore, the efficiency of the joint work can be improved, and the connection time can be shortened, resulting in reduction in connection cost.

Furthermore, according to this embodiment, since the recording data of a joint work or a local operation can be stored as a file, various processing may be applicable on these data, for example, the recording data can be deleted afterwards if occasion demands. According to this embodiment, any one of voice, pictures and operation data may be selectively specified as data to be recorded in the data recording operation. Therefore, when the local operation is recorded and transmitted, a unnecessary portion can be prevented from being transmitted, so that more efficient communication can be achieved.

Furthermore, according to this embodiment, when the communication sender switches the operation mode to a local operation mode because a communication recipient is absent and then transmits created recording data, the address of the communication recipient to which the communication sender tries to connect is automatically specified without his indicating the address of the communication recipient again, whereby the operation can be smoothly performed.

As described above, this embodiment can achieve an efficient communication having both the advantage of the real-time communication and the advantage of the non real-time communication.

In this embodiment, video data and audio data are stored in the same recording file, however, these data may be separately stored in separate files if necessary because in some cases the data amount of these video and audio data may increase. Further, in order to reduce the data value, a suitable data compression technique may be applied.

Figure 35:
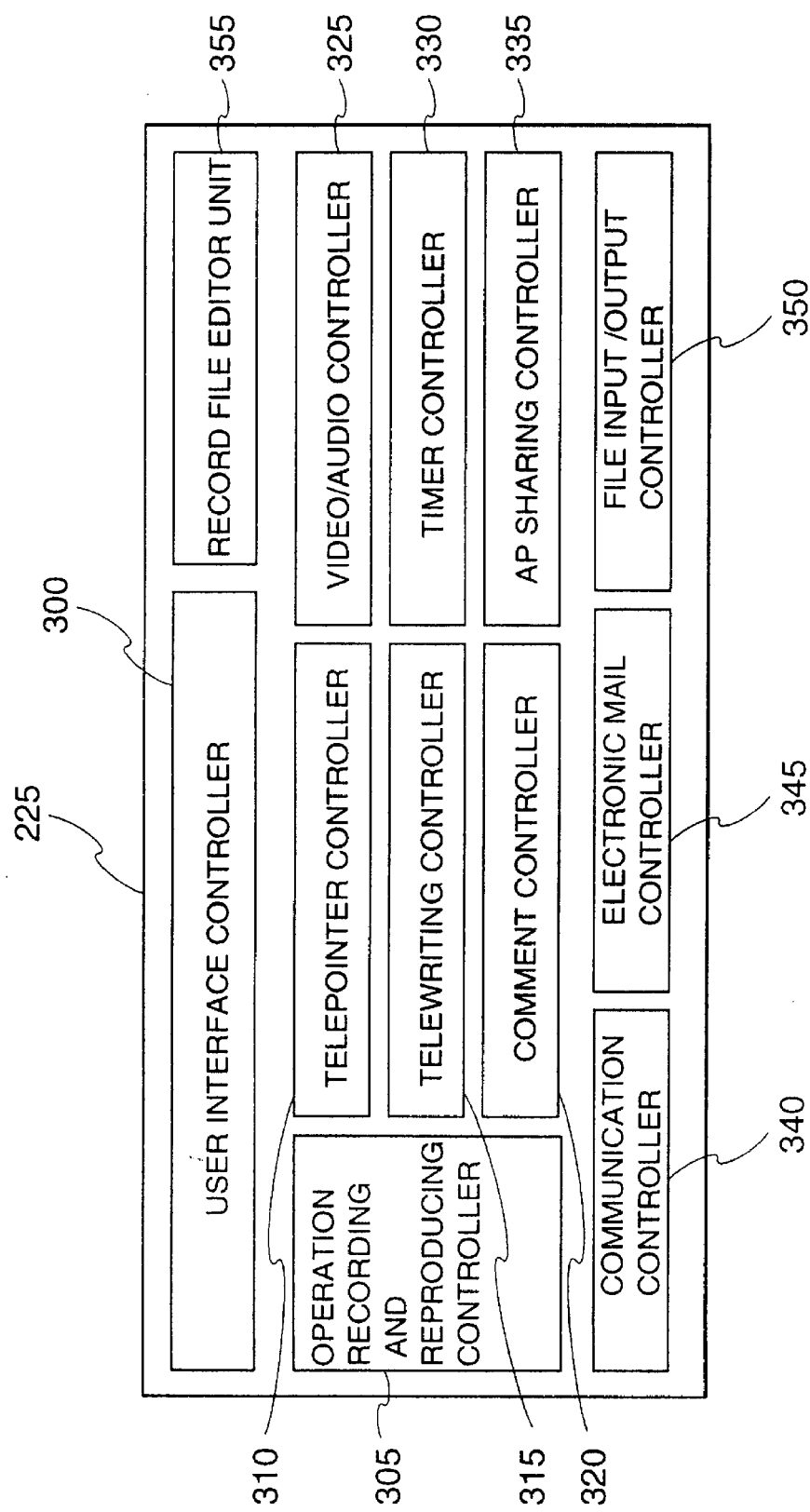
FIG. 35 is a block diagram showing another embodiment of the software construction of the electronic interactive control program.

As another embodiment, the electronic interaction control program 225 of the system as described above may be provided with a recording file editor unit 355 which supplies the function of editing the content of a recording file as shown in FIGS. 29 to 33 as shown in FIG. 35. That is, an edition of cutting out desired portions from a recording file, changing the order thereof or the like may be performed.

With this configuration, the recording file can be created more efficiently.

According to the present invention, there can be provided a joint work support system in which even under the local state where a communication sender does not connect to a communication recipient, the communication sender can create data by using the joint work support function provided to each terminal of the system as if he did joint work in cooperation with the communication recipient, and transmit the data to the communication recipient.

Furthermore, according to the present invention, there can be provided a joint work support system in which the communication recipient receives data which are transmitted from another terminal (a communication sender), and reproduces the received data in accordance with the time corresponding relationship at the time when the data are created, whereby the communication sender can perform the communication as if he performed joint work in cooperation with the communication recipient.

What is claimed is:

1. A joint work support system, comprising:
   a plurality of terminals mutually connected to one another through a network, each terminal including:
   first data communication means for mutually communicating video data and audio data existing on the terminal with at least one of the other terminals, and
   operation means, for performing operations to support joint work in both a joint work state, when the terminal is connected to another terminal through the network, and a local state, when the terminal is not connected to another terminal through the network, having a common area provided on at least a part of a screen thereof to be shared with said plurality of terminals during the joint work state and for performing operations to support, in the common area, the joint work between the terminals,
   wherein, to operate in the local state, each of the terminals further includes:
   recording data creating means for creating recording data containing at least operation data among the operation data, video data existing on said terminal and audio data existing on the terminal, said operation data comprising data corresponding to an operation performed by said operating means and time information representing the time when the operation is performed;
   second data communication means for transmitting the created recording data to other terminals and receiving recording data which are created and transmitted by the other terminals; and
   reproduction means for reproducing the recording data received by said second data communication means in accordance with the time information contained in the recording data.

2. The joint work support system as claimed in claim 1, wherein said operation means performs pseudo-joint work during the local state on the common area which is temporarily set on the terminal in advance.

3. The joint work support system as claimed in claim 1, wherein said recording data creating means creates the recording data by associating the time information of the respective data contained in the recording data with one another when the recording data contains not only the operation data, but also at least one of the video data and the audio data.

4. The joint work support system as claimed in claim 1, each of the plurality of terminals further including:
   storage means for storing the recording data which are created by said recording data creating means.

5. The joint work support system as claimed in claim 1, each of the plurality of terminals further including:
   selection means for receiving an instruction of selecting data to be contained in the recording data which are created by said recording data creating means.

6. The joint work support system as claimed in claim 2, wherein said recording data creating means creates the recording data by associating the time information of the respective data contained in the recording data with one another when the recording data contains not only the operation data, but also at least one of the video data and the audio data.

7. The joint work support system as claimed in claim 2, each of the plurality of terminals further including:
   storage means for storing the recording data which are created by said recording data creating means.

8. The joint work support system as claimed in claim 2, each of the plurality of terminals further including:
   selection means for receiving an instruction of selecting data to be contained in the recording data which are created by said recording data creating means.

9. The joint work support system as claimed in claim 2, wherein said second data communication means comprises electronic mail means for transmitting the recording data created by said recording data creating means to another terminal corresponding to an indicated address through the network.

10. The joint work support system as claimed in claim 9, each of the plurality of terminals further including:
    address setting means for setting the address of the electronic mail; and
    local operation selection means for receiving an instruction as to whether the operation is shifted to the local state when a connection trial to another terminal through the network to perform the joint work fails,
    wherein said address setting means sets said other terminal as an address of the electronic mail when said local operation selection means selects the shift to the local state.

11. The joint work support system as claimed in claim 1, each of the plurality of terminals further including:
    data edition means for editing the recording data which are created by said recording data creating means.

12. The joint work support system as claimed in claim 1, wherein said reproduction means has reproduction speed control means for controlling a reproduction speed during reproduction of the recording data.

13. The joint work support system as claimed in claim 1, wherein said reproduction means has reproduction data selection means for receiving an indication of data to be reproduced in the recording data.

14. The joint work support system as claimed in claim 2, each of the plurality of terminals further including:
    data edition means for editing the recording data which are created by said recording data creating means.

15. The joint work support system as claimed in claim 2, wherein said reproduction means has reproduction speed control means for controlling a reproduction speed during reproduction of the recording data.

16. The joint work support system as claimed in claim 2, wherein said reproduction means has reproduction data selection means for receiving an indication of data to be reproduced in the recording data.

17. A terminal for a joint work support system, comprising:
    first data communication means for mutually communicating video data and audio data with other terminals;
    operation means which mutually and commonly uses at least a partial area of a screen thereof with other terminals and supports joint work to be performed in the common area, and is connected to the other terminals through a network, the operation means performing operations to support the joint work in both a joint work state, when the terminal is connected to another terminal through the network, and a local state, when the terminal is not connected to another terminal through the network;
    recording data creating means for creating recording data containing at least operation data of the operation data, video data existing on said terminal and audio data existing on the terminal, said operation data comprising data corresponding to an operation performed by said operating means and time information representing the time when the operation is performed;

second data communication means for transmitting the created recording data to the other terminals and receiving recording data which are created and transmitted by the other terminals; and reproduction means for reproducing the recording data received by said second data communication means in accordance with the time information contained in the recording data.

18. The joint work support system as claimed in claim 17, wherein said operation means performs pseudo-joint work during the local state on the common area which is temporarily set on the terminal in advance.

19. A storage medium for storing a program which controls a joint work support system, comprising:

a plurality of terminals mutually connected to one another through a network, each terminal including:

first data communication means for mutually communicating video data and audio data existing on the terminal with at least one of the other terminals, and operation means, for performing operations to support joint work in both a joint work state, when the terminal is connected to another terminal through the network, and a local state, when the terminal is not connected to another terminal through the network, which is provided with a common area at least on a part of a screen thereof so as to be commonly usable among said plurality of terminals, and which serves to perform operations to support the joint work to be performed in the common area, wherein said program performs a control operation so that said terminal creates recording data containing at least operation data of the operation data, video data existing on said terminal and audio data existing on the terminal, the operation data comprising data corresponding to an operation performed by said operation means and time information representing the time when the operation is performed, transmits the created recording data to other terminals and receives recording data which are created and transmitted by the other terminals via a second data communication means, and reproduces the received recording data in accordance with the time information contained in the recording data.

20. The storage medium as claimed in claim 19, wherein said operation means performs said operations on the common area which is temporarily set on the terminal.

21. The storage medium as claimed in claim 19, wherein said program further performs the control operation so that the recording data are created while the time information of the respective data contained in the recording data are associated with one another when the recording data contains not only the operation data, but also at least one of the video data and the audio data.

22. The storage medium as claimed in claim 19, wherein said program further performs the control operation so that each of said plurality of terminals stores the created recording data in a storage means.

23. The storage medium as claimed in claim 19, wherein said program further performs the control operation so that each of said plurality of terminals receives an instruction of selecting data to be contained in the recording data.

24. The storage medium as claimed in claim 20, wherein said program further performs the control operation so that the recording data are created with the time information of the respective data contained in the recording data associated with one another when the recording data contains not only the operation data, but also at least one of the video data and the audio data.

25. The storage medium as claimed in claim 20, wherein said program further performs the control operation so that each of said plurality of terminals stores the created recording data in a storage means.

26. The storage medium as claimed in claim 20, wherein said program further performs the control operation so that each of said plurality of terminals receives an instruction of selecting data to be contained in the recording data.

27. The storage medium as claimed in claim 20, wherein said communication means transmits the created recording data to another terminal corresponding to the indicated address through the network by electronic mail.

28. The storage medium as claimed in claim 27, wherein said program further performs the control operation so that each of said plurality of terminals sets an address of the electronic mail, receives an instruction as to whether the shift to the local state is selected when the connection to another terminal through the network for the joint work fails, and sets said other terminal as the address of the electronic mail when the shift of the local state is selected.

29. The storage medium as claimed in claim 19, wherein said program further performs the control operation so that each of said plurality of terminals edits the created recording data.

30. The storage medium as claimed in claim 19, wherein said program further performs the control operation so that a reproduction speed at which the recording data are recorded is adjusted.

31. The storage medium as claimed in claim 19, wherein said program further performs the control operation so that a selection of data to be reproduced in the recording data is received.

32. The storage medium as claimed in claim 20, wherein said program further performs the control operation so that each of said terminals edits the created recording data.

33. The storage medium as claimed in claim 20, wherein said program further performs the control operation so that a reproduction speed at which the recording data are reproduced is adjusted.

34. The storage medium as claimed in claim 20, wherein said program further performs the control operation so that a selection of data to be reproduced in the recording data is received.

* * * * *